US012761530B2

(12) United States Patent
Odagaki

(10) Patent No.: US 12,761,530 B2
(45) Date of Patent: Oct. 13, 2026

(54) ELECTRONIC APPARATUS

(71) Applicant: CANON KABUSHIKI KAISHA, Tokyo (JP)

(72) Inventor: Koichi Odagaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 18/950,766

(22) Filed: Nov. 18, 2024

(65) Prior Publication Data

US 2025/0076735 A1 Mar. 6, 2025

Related U.S. Application Data

(63) Continuation of application No. PCT/JP2023/017068, filed on May 1, 2023.

(30) Foreign Application Priority Data

Jun. 3, 2022 (JP) ................................ 2022-091080

(51) Int. Cl.
*G03B 13/02* (2021.01)

(52) U.S. Cl.
CPC .................................... *G03B 13/02* (2013.01)

(58) Field of Classification Search
CPC ........ G03B 13/02; G03B 13/06; G03B 17/02; G03B 17/04; H04N 23/53
See application file for complete search history.

(56) References Cited

U.S. PATENT DOCUMENTS

2009/0207303 A1* 8/2009 Kusatsugu ............. H04N 23/63 348/E5.026
2012/0057027 A1* 3/2012 Wu ........................ G03B 13/02 348/E5.09

(Continued)

FOREIGN PATENT DOCUMENTS

JP 2005191700 A 7/2005
JP 2019179947 A 10/2019
JP 2020122946 A 8/2020

OTHER PUBLICATIONS

Foreign Patent Documents #1 and 3 were cited in the International Search Report dated Jun. 27, 2023, of International Application No. PCT/JP2023/017068, a which is enclosed with an English translation.

(Continued)

*Primary Examiner* — Kelly L Jerabek
(74) *Attorney, Agent, or Firm* — Cowan, Liebowitz & Latman, P.C.

(57) ABSTRACT

In an electronic apparatus, a movable unit moves between stored and drawing positions and rotates between drawing and rotated positions relative to a main body. A flexible substrate, which electrically connects the movable unit to the main body, has a flexible portion between a first fixed portion fixed to the movable unit and a second fixed portion fixed on a main body side relative to the first fixed portion. The flexible portion has first, second, and third shapes when the movable unit is in the stored, drawing and rotated positions, respectively. The movable unit has a first substrate restriction portion, which is positioned in a storage direction relative to the first and second fixed portions when in the stored position, and is positioned in a drawing direction relative to the second fixed portion when in the drawing position, as a portion capable of contacting the flexible portion.

12 Claims, 15 Drawing Sheets

(56) References Cited

U.S. PATENT DOCUMENTS

| | | | | |
|---|---|---|---|---|
| 2019/0394403 | A1* | 12/2019 | Osada | H04N 23/50 |
| 2020/0252530 | A1* | 8/2020 | Iwai | H04N 23/531 |

OTHER PUBLICATIONS

Dec. 12, 2024 PCT/IB/338 (PCT Notification of Transmittal of Translation of the International Preliminary Report on Patentability) from International Application No. PCT/JP2023/017068.

Dec. 12, 2024 PCT/IB/373 (PCT International Preliminary Report on Patentability) from International Application No. PCT/JP2023/017068.

Dec. 12, 2024 PCT/ISA/237 (PCT Written Opinion of the International Searching Authority) from International Application No. PCT/JP2023/017068.

* cited by examiner

AA-AA CROSS-SECTION

BB-BB CROSS-SECTION

CC-CC CROSS-SECTION

DD-DD CROSS-SECTION

ELECTRONIC APPARATUS

CROSS-REFERENCE TO RELATED APPLICATIONS

This application is a Continuation of International Patent Application No. PCT/JP2023/017068, filed on May 1, 2023, which claims the benefit of Japanese Patent Application No. 2022-091080, filed on Jun. 3, 2022, which is hereby incorporated by reference herein in their entirety.

BACKGROUND

Technical Field

The present disclosure relates to an electronic apparatus, such as an imaging apparatus with a movable unit.

Description of Related Art

Some display units, such as electronic viewfinders provided on an imaging apparatus, are designed to be extendable from a main body of the imaging apparatus and further rotatable when extended, and thereby the user's freedom of posture during image capture is enhanced.

Japanese Patent Laid-open No. 2019-179947 discloses an imaging apparatus including a finder unit that is extendable and rotatable. In this imaging apparatus, a flexible substrate is used for the electrical connection between the substrate provided in the finder unit and the control unit fixed to the main body, and deforms according to the extension and rotation of the finder unit relative to the main body.

In the imaging apparatus of Japanese Patent Laid-open No. 2019-179947, the restrictions on the movement and deformation of the flexible substrate in response to the extension and rotation of the finder unit relative to the main body are insufficient. As a result, there is a risk that excessive stress may be applied to the flexible substrate or that the flexible substrate may become pinched between other components.

SUMMARY

An electronic apparatus according to one aspect of the present disclosure includes a movable unit configured to move between a stored position and a drawing position, and to rotate between the drawing position and a rotated position relative to a main body of the electronic apparatus, and a flexible substrate configured to electrically connect the movable unit and the main body. The flexible substrate includes a flexible portion between a first fixed portion fixed to the movable unit and a second fixed portion fixed on a main body side relative to the first fixed portion. The flexible portion has a first shape, a second shape, and a third shape, each being different from one another when the movable unit is in the stored position, the drawing position, and the rotated position, respectively. The movable unit has a first substrate restriction portion, which is positioned in a storage direction relative to the first and second fixed portions when in the stored position, and is positioned in a drawing direction relative to the second fixed portion when in the drawing position, as a portion capable of contacting the flexible portion. The first substrate restriction portion restricts deformation of the flexible portion from the second shape to any shape other than the first shape when the movable unit moves from the drawing position to the stored position, and restricts deformation of the flexible portion from the third shape to any shape other than the second shape when the movable unit rotates from the rotated position to the drawing position.

Further features of the disclosure will become apparent from the following description of embodiments with reference to the attached drawings.

DESCRIPTION OF THE EMBODIMENTS

The following describes embodiments of the present disclosure with reference to the drawings.

Figure 1A:
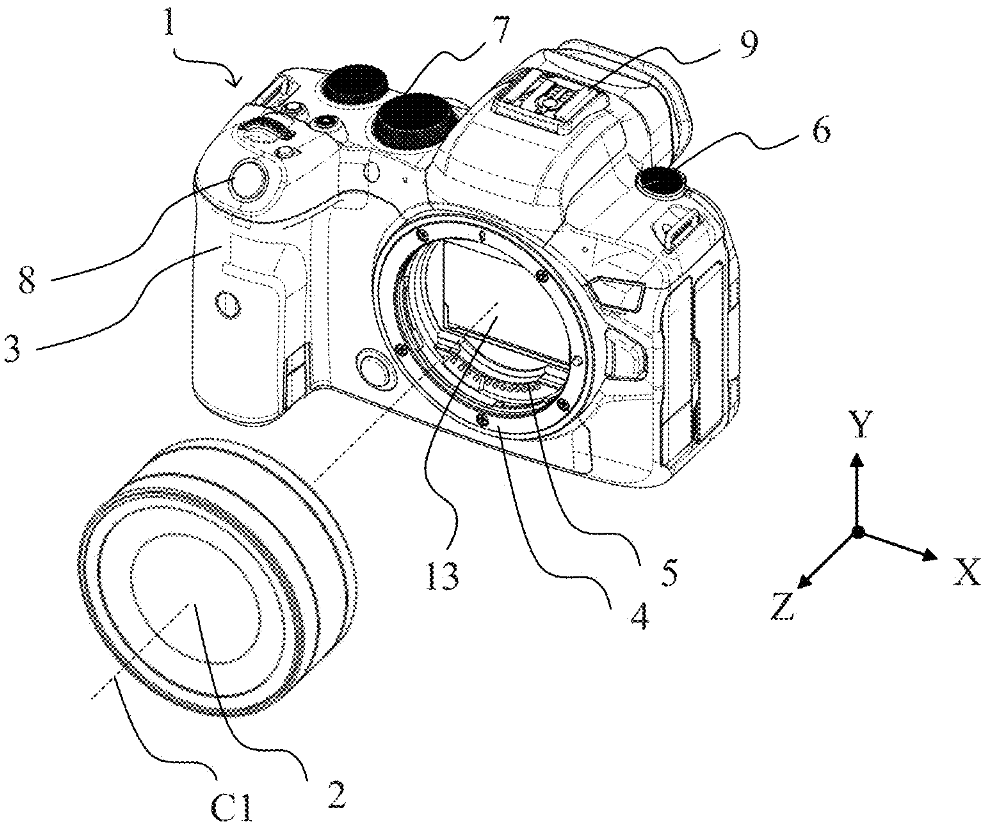
FIGS. 1A and 1B are respectively a front and rear perspective view of an imaging apparatus according to an embodiment.
Figure 1B:
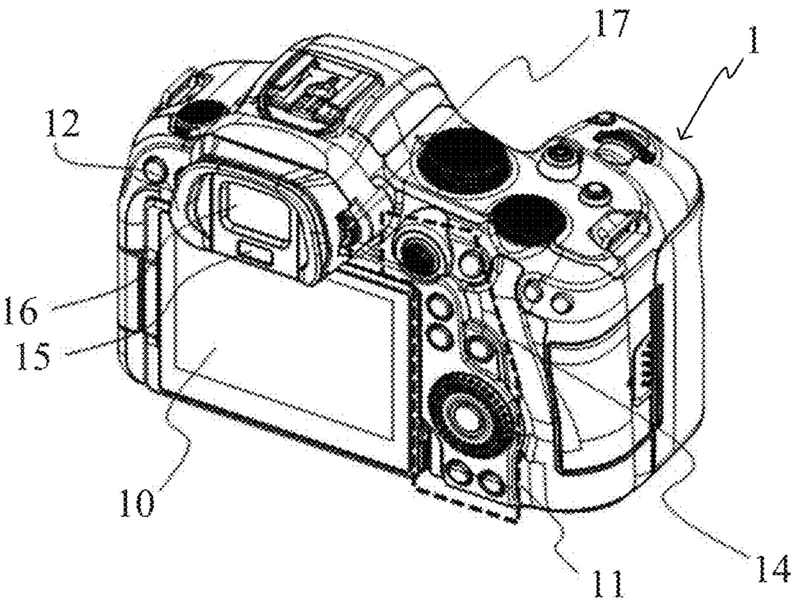

FIGS. 1A and 1B illustrate an imaging apparatus (a digital still camera, hereinafter referred to as 'camera') 1 as an embodiment of the present disclosure. FIG. 1A illustrates the camera 1 from an oblique front view, and FIG. 1B illustrates the camera 1 from an oblique rear view. An interchangeable lens 2 is detachably mounted on the camera 1. It should be noted that the imaging apparatus may be equipped with a built-in lens.

In the following description, a direction in which an optical axis C1 of the interchangeable lens 2 extends toward the subject (front) is referred to as a +Z direction, and an opposite side (rear) as a −Z direction, with both collectively referred to as a Z direction. Additionally, a right side when viewed from the rear is referred to as a −X direction, and a left side as a +X direction, with both collectively referred to as a X direction. Furthermore, an upward direction is referred to as a +Y direction, and a downward direction as a −Y direction, with both collectively referred to as a Y direction. The X, Y, and Z directions are mutually orthogonal.

A front grip 3, to be grasped by the user, is provided on the right side of the front surface of the camera 1 so that it protrudes forward. In the center of the front surface of the camera 1, a mount 4 is provided for attaching the interchangeable lens 2. The mount 4 is equipped with a group of electrical contacts 5. The camera 1 communicates with and supplies power to the interchangeable lens 2 attached to the mount 4 via the group of electrical contacts 5. Inside the camera 1, behind the mount 4, an imaging element 13 is provided to capture an object image (optical image) formed by an imaging optical system within the interchangeable lens 2.

On the top surface of the camera 1, a power lever 6, a mode dial 7, a release button 8, and an accessory shoe 9 are provided. The power lever 6 is operated by the user to switch the camera 1 on or off. The mode dial 7 is operated by the user to switch imaging modes. The release button 8 is operated by the user to initiate imaging preparation actions such as AF and AE, or to start imaging. The accessory shoe 9 is provided above the mount 4 of the camera 1, allowing various external accessories to be attached and detached.

On the rear surface of the camera 1, a display part 10, a rear operation part 11, and a finder part 12 are provided. When the power of the camera 1 is turned on and either the still image shooting mode or video recording mode is set, a display image (live view image) generated using the output signal from the imaging element 13 is shown on the display part 10. Additionally, the display part 10 also shows imaging parameters such as a shutter speed and an aperture value.

The rear operation part 11 includes a playback button for instructing the playback of recorded images. When the user operates the playback button, the captured images are played back on the display part 10. The rear operation part 11 also includes a video recording button for instructing video recording. When the user operates the video recording button, video recording is started or stopped. Next to the rear operation part 11, there is a finger contact surface 14 for the user to place their thumb when holding the camera 1.

The finder part 12, as a movable unit (display unit), has a sensor window 15, an eyepiece window 16, and a diopter adjustment dial 17. The sensor window 15 is positioned below the eyepiece window 16 and is provided to secure an optical path for eyepiece detection by the eyepiece sensor, which will be described later. When the eyepiece sensor detects that the user is looking through (has approached) the eyepiece window 16, the live view image displayed on the display part 10 switches to the finder display panel, which will be described later, inside the finder part 12. The diopter adjustment dial 17 is located on the side where the front grip 3 and the finger contact surface 14 are provided. By operating the diopter adjustment dial 17, the user can adjust the diopter so that the displayed image is in focus when viewed through the finder part 12.

Figure 2A:
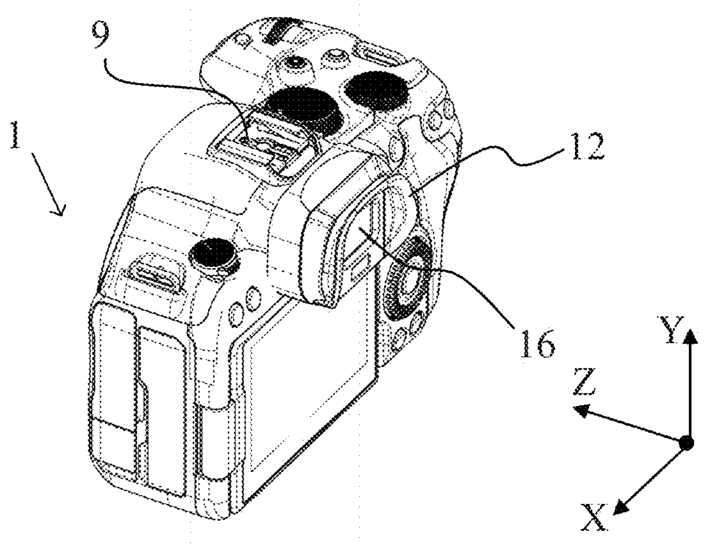
FIGS. 2A to 2C are rear perspective views of the imaging apparatus according to the embodiment (finder part in stored, extended, and rotated states).
Figure 2B:
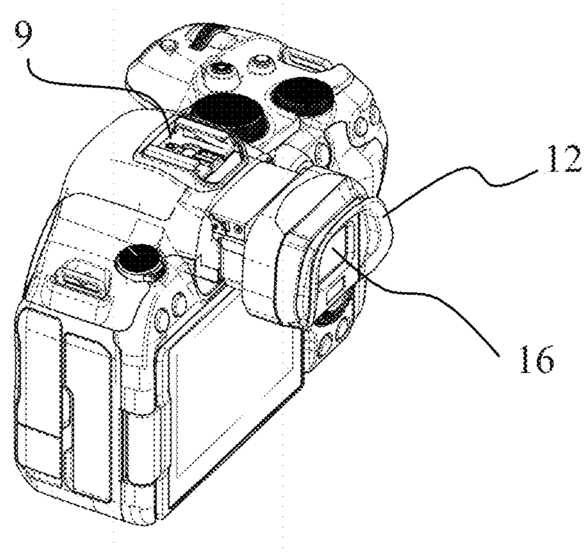
Figure 2C:
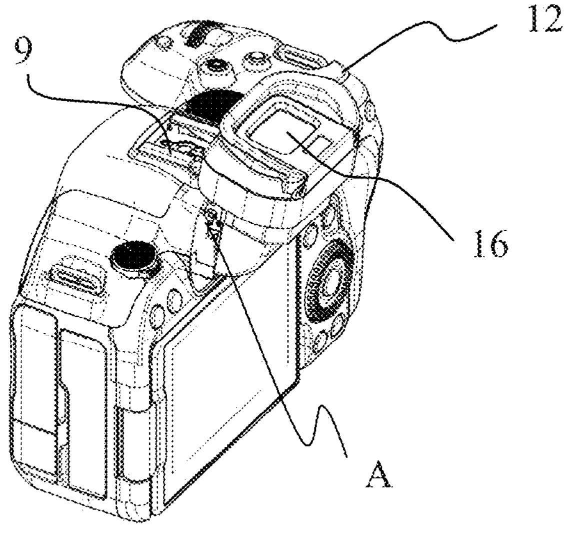

The finder part 12 can move between a stored position, as illustrated in FIG. 2A, where it is retracted into the camera 1, and a drawing position, as illustrated in FIG. 2B, where it is pulled out toward the rear (in the −Z direction) from the camera 1. Furthermore, the finder part 12 can also move (rotate) to a tilted position, as illustrated in FIG. 2C, where it rotates upward (in the +Y direction) around a rotation axis A extending in the X direction from the drawn-out position relative to the camera 1. The finder part 12 can rotate to an angle where the eyepiece window 16 faces almost directly upward.

In the following explanation, the state of the finder part 12 illustrated in FIG. 2A is referred to as the stored state, and the position of the finder part 12 in the stored state is called the stored position. The state illustrated in FIG. 2B is referred to as the drawn-out state, and the position of the finder part 12 in the drawn-out state is called the drawing position. Furthermore, the state illustrated in FIG. 2C is referred to as the rotated state, and the position of the finder part 12 in the rotated state is called the rotated position.

In any of the stored state, drawn-out state, or rotated state, the user can look through the eyepiece window 16 to view the live view image. The stored state is suited for normal shooting and portability. The drawn-out state is when the user can look through the eyepiece window 16 without their face interfering with a large external accessory attached to the accessory shoe 9. The finder part 12 can seamlessly change and hold its rotation angle from the drawn-out position to the maximum rotated position illustrated in FIG. 2C. This increases the freedom of posture for the user when looking through the eyepiece window 16.

Figure 3B:
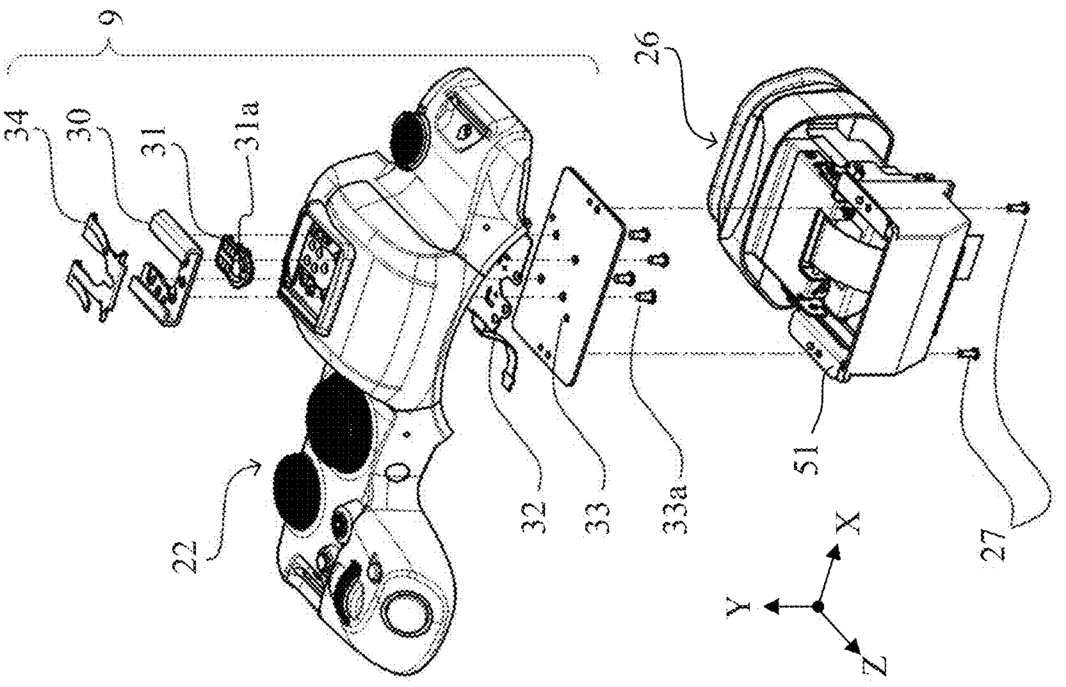
FIGS. 3A and 3B are exploded perspective views of the imaging apparatus according to the embodiment.
Figure 3A:
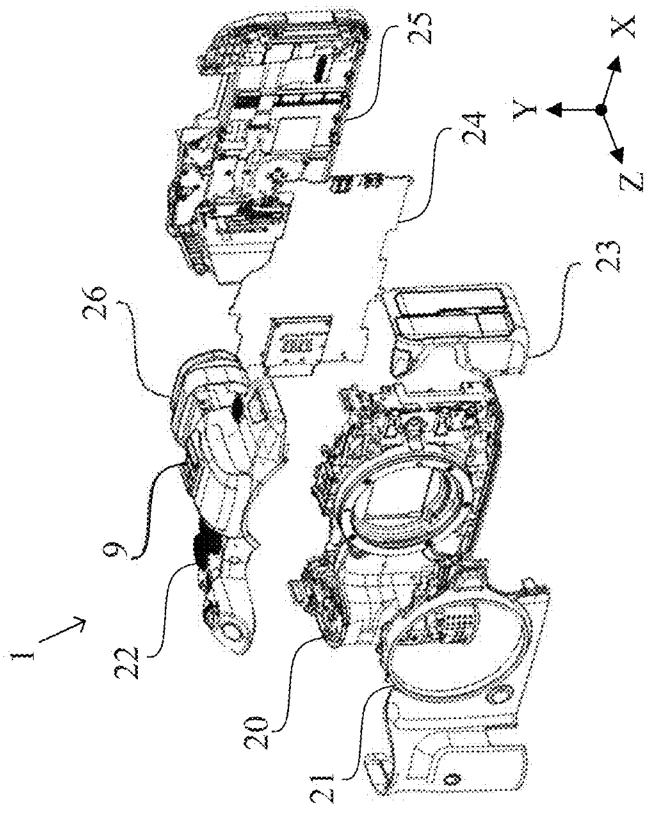

FIG. 3A illustrates a disassembled view of the camera 1. The camera 1 is constructed by assembling multiple units with respect to an internal structural member 20. These units include a front cover unit 21, a top cover unit 22, a side cover unit 23, a main substrate 24, and a rear cover unit 25. A finder unit 26 is assembled inside the top cover unit 22. The top cover unit 22 and the finder unit 26 are fixed to the internal structural member 20 in an integrated state. The top cover unit 22 also serves as an exterior unit that covers a part of the finder part 12 and constitutes a part of the camera 1's appearance.

FIG. 3B illustrates a disassembled view of the top cover unit 22, the accessory shoe 9, and the finder unit 26. The accessory shoe 9 includes a shoe engagement member 30, a signal terminal stage 31, an accessory shoe flexible substrate 32, an accessory shoe holding member 33, and an accessory shoe spring 34. The shoe engagement member 30 is a component for engaging and holding attached external accessories. The signal terminal stage 31 has a structure where contact members 31*a* for external accessories are held on a base member formed of resin material. The accessory shoe flexible substrate 32 is electrically connected to the contact members 31*a* and electrically connected to the main substrate 24, enabling communication between the external accessories attached to the accessory shoe 9 and the camera 1.

Figure 8:
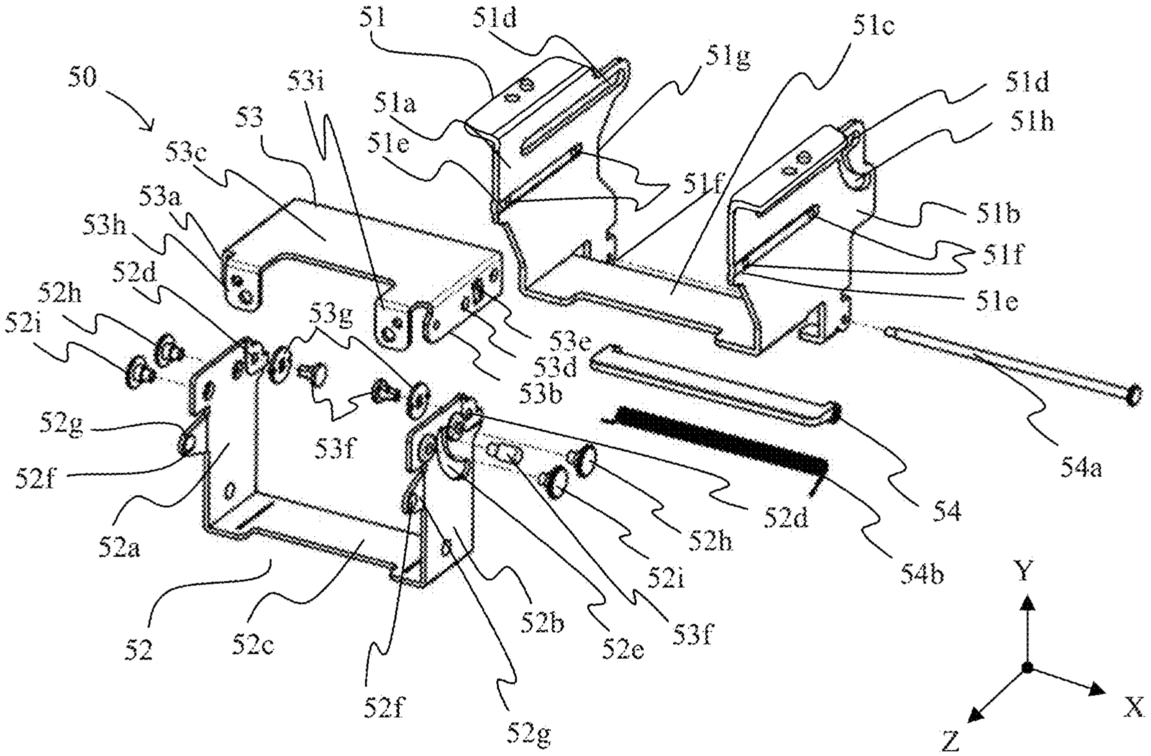
FIG. 8 is an exploded perspective view of a finder support mechanism.

The accessory shoe holding member 33 is a structural body that holds the shoe engagement member 30, providing high rigidity and strength within the top cover unit 22. Four screws 33*a* pass through the accessory shoe holding member 33, the accessory shoe flexible substrate 32, and the top cover unit 22, screwing into the shoe engagement member 30, thereby securely holding the accessory shoe holding member 33 and the shoe engagement member 30. The signal terminal stage 31 is sandwiched between the shoe engagement member 30 and the top cover unit 22. The accessory shoe spring 34, made of conductive metal material, includes an elastic deformation part that biases attached external accessories in the +Y direction. The finder unit 26 is assembled from inside the top cover unit 22 and firmly held by fastening to the accessory shoe holding member 33 with two screws 27. During this process, fixing plate 51, a part of the finder unit 26 as illustrated in FIG. 8, is fixed to the top cover unit 22 through the accessory shoe holding member 33.

Figure 4A:
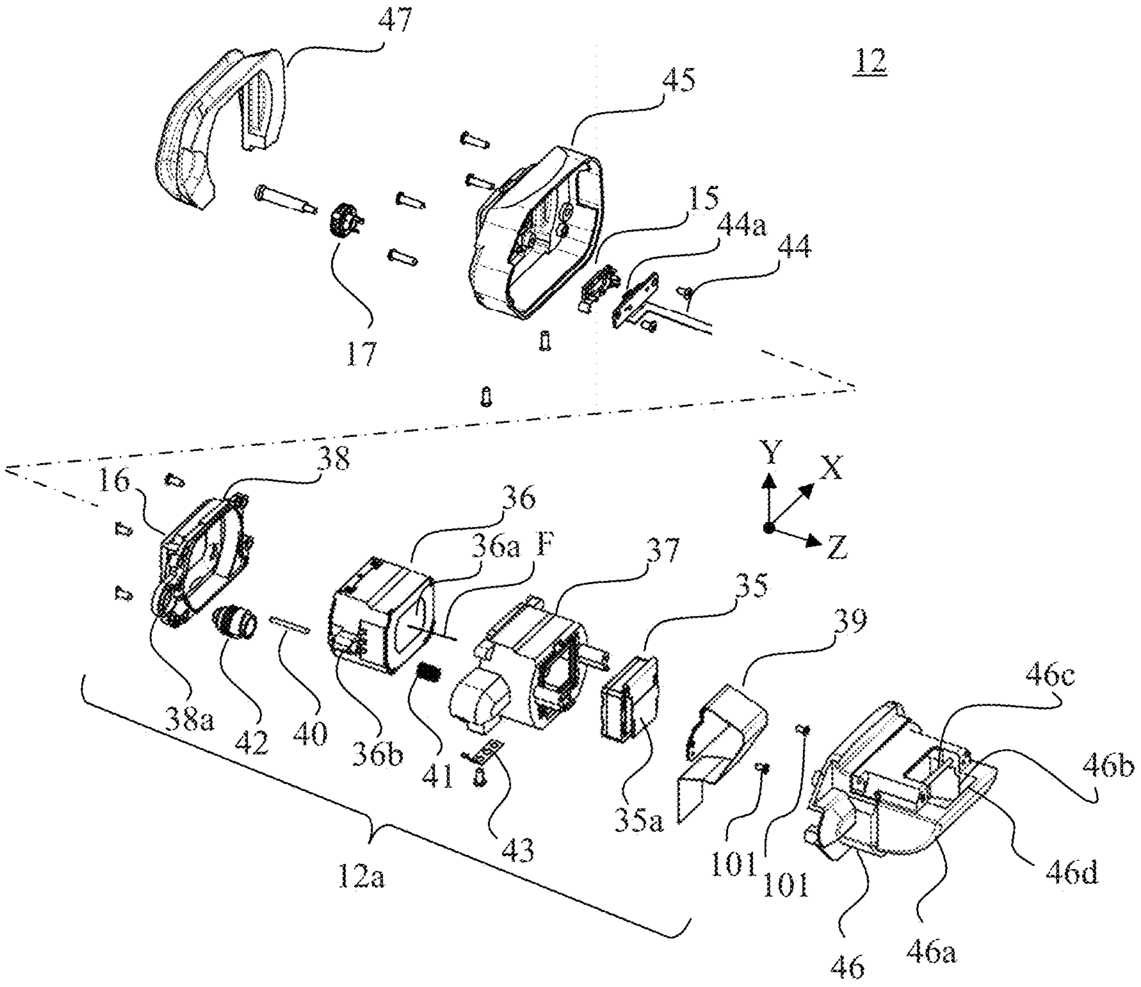
FIGS. 4A and 4B are an exploded perspective view of a finder unit and a perspective view of a cam member.

FIG. 4A illustrates a disassembled view of the finder part 12. An optical unit 12*a* of the finder part 12 includes a previously mentioned finder internal display panel (display element) 35, a lens holder 36, a fixed barrel 37, a lens front cover 38, a flexible substrate for the finder (hereinafter referred to as finder FPC) 39, a guide shaft 40, and a cam member 42. The finder internal display panel 35 is fixed to the fixed barrel 37 with double-sided tape.

The lens holder 36 holds a lens group 36*a* that guides light emitted from the finder internal display panel 35 to the eyepiece window 16. The guide shaft 40 passes through a sleeve part 36*b* of the lens holder 36. Both ends of the guide shaft 40 are held by the fixed barrel 37 and the lens front cover 38. The guide shaft 40 guides the lens holder 36 in the Z direction along the optical axis of the lens group 36*a* (hereinafter referred to as the finder optical axis). A spring 41 is positioned between the lens holder 36 and the fixed barrel 37. The spring 41 biases the lens holder 36 in the −Z direction.

Figure 4B:
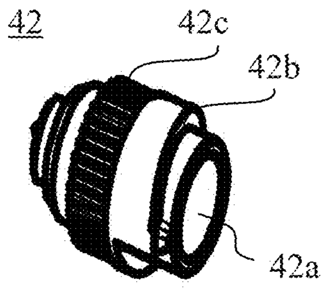

FIG. 4B enlarges the cam member 42. The cam member 42 includes a bearing part 42*a*, a cam part 42*b*, and a gear part 42*c*. A shaft part (not illustrated) of the fixed barrel 37 passes through the bearing part 42*a*. In this state, the cam member 42 is sandwiched between the fixed barrel 37 and the lens front cover 38. As a result, the cam member 42 is rotatably held by the fixed barrel 37.

Figure 5A:
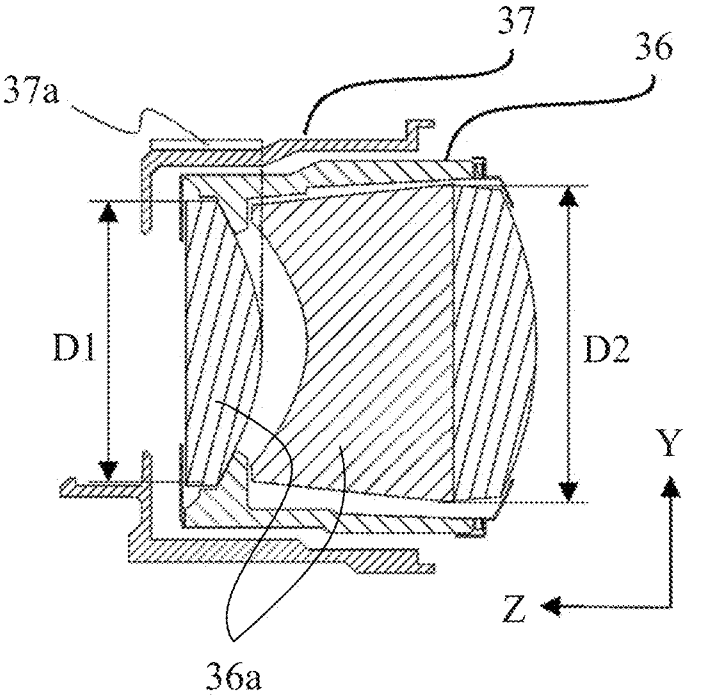
FIGS. 5A and 5B are a cross-sectional view and a rear view of the finder unit.
Figure 5B:
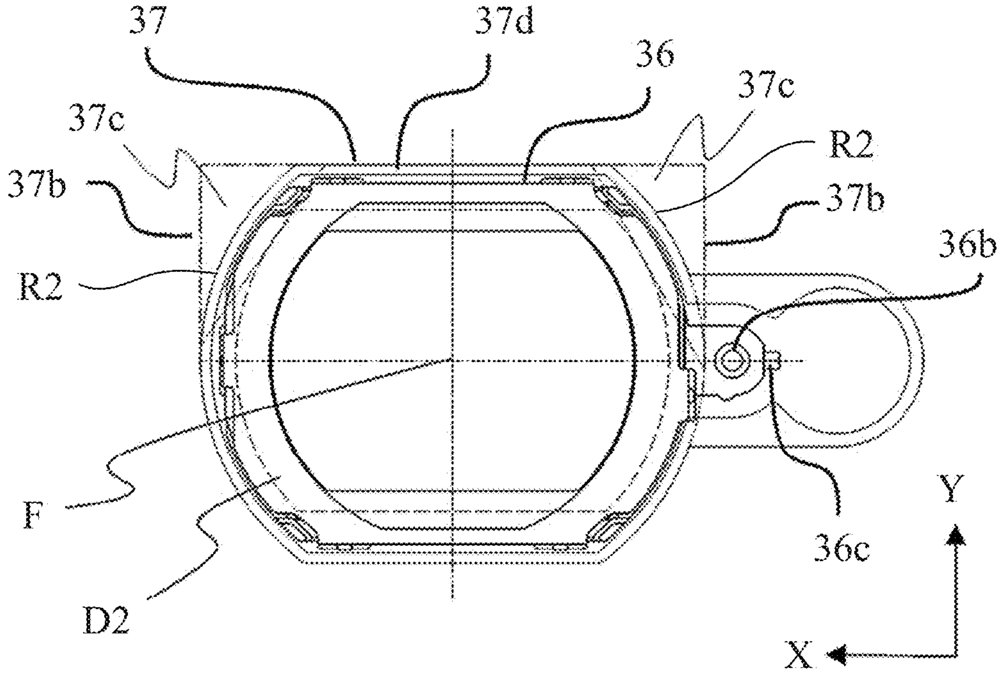

FIG. 5A illustrates a YZ cross-section of the lens holder 36 and the fixed barrel 37. FIG. 5B illustrates the lens holder 36 and the fixed barrel 37 as viewed from the −Z direction. As illustrated in FIG. 4A, the lens holder 36 is biased in the −Z direction by the spring 41. Thus, a protrusion 36*c* of the lens holder 36 always contacts the cam part 42*b* of the cam member 42, as illustrated in FIG. 5B. The cam member 42 is integrally rotatable with the diopter adjustment dial 17 illustrated in FIG. 4A. When the cam member 42 rotates, the lens holder 36 moves in the Z direction via the lift of the cam part 42*b* through the protrusion 36*c*. During this movement, the sleeve part 36*b* of the lens holder 36 is guided in the Z direction by the guide shaft 40. A plate spring 43 elastically engages with the gear part 42*c* of the cam member 42 to maintain its rotational position. In this configuration, when the user rotates the diopter adjustment dial 17, the lens holder 36 moves in the Z direction, allowing adjustment of the finder part 12 to the user's eyesight.

Figure 6:
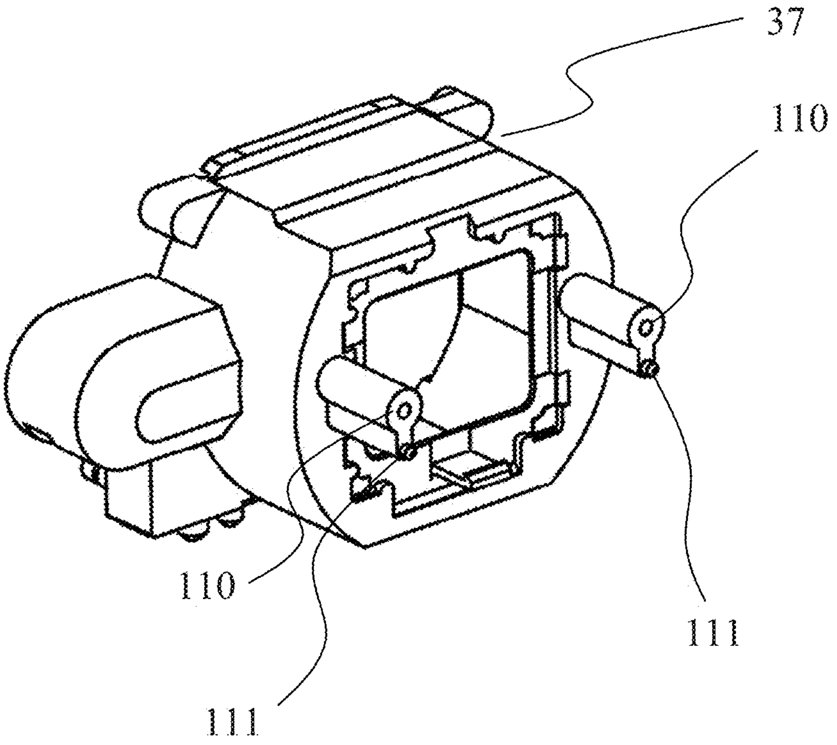
FIG. 6 is a perspective view of a fixed barrel of the finder unit.

FIG. 6 enlarges the fixed barrel 37. The fixed barrel 37 has two screw holes 110 into which screws 101 illustrated in FIG. 4A are screwed, and two positioning protrusions 111 for positioning the finder FPC 39.

Figure 7A:
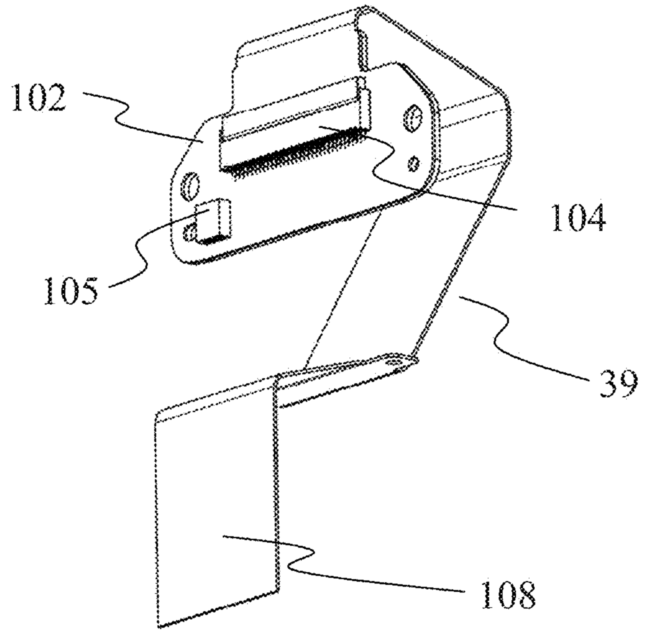
FIGS. 7A and 7B are perspective views of a finder flexible substrate.
Figure 7B:
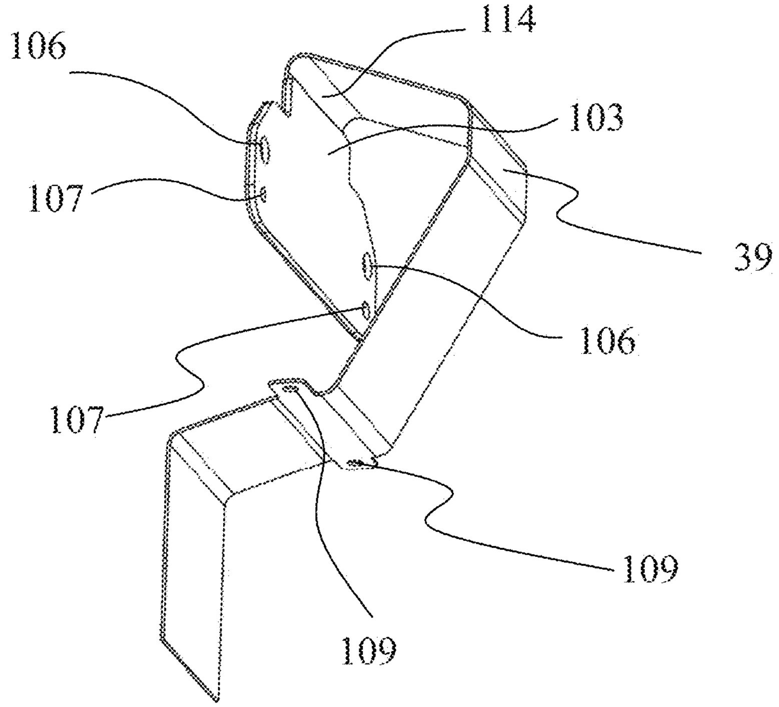

FIGS. 7A and 7B enlarge the finder FPC 39. FIG. 7A illustrates the finder FPC 39 viewed from an oblique front side, and FIG. 7B illustrates it from an oblique rear side.

The finder FPC 39 electrically connects the main substrate 24 illustrated in FIG. 3A with a display panel substrate 35*a* illustrated in FIG. 4B, and electrically connects the display panel substrate 35*a* with the eyepiece sensor flexible substrate (hereinafter referred to as sensor FPC) 44 illustrated in FIG. 4B. The display panel substrate 35*a* accommodates the finder internal display panel 35, while the sensor FPC 44 accommodates the eyepiece sensor 44*a*.

As illustrated in FIG. 7B, a reinforcing plate 103 is attached to the back surface of a connector mounting part 102 of the finder FPC 39. This increases the rigidity of the connector mounting part 102 in the finder FPC 39 compared to other parts. The connector mounting part 102 is equipped with connectors 104 for connecting the display panel substrate 35*a* and connectors 105 for connecting the sensor FPC 44. The connector mounting part 102 has two screw insertion holes 106 and two positioning holes 107. The two positioning holes 107 accommodate the two positioning protrusions 111 of the fixed barrel 37. Thus, the connector mounting part 102 is positioned relative to the fixed barrel 37. In this state, screws 101 inserted into screw insertion holes 106 are screwed into screw holes 110 of the fixed barrel 37, thereby fixing the connector mounting part 102 as a first fixed portion to the fixed barrel 37. The boundary 114 between the part where the reinforcing plate 103 is attached to the finder FPC 39 and the part where it is not attached is the boundary between the region of the finder FPC 39 that cannot deform and the region that can deform.

Furthermore, the finder FPC 39 has two positioning holes 109. Additionally, as illustrated in FIG. 14, the finder FPC 39 has connector connection terminal parts 108 connected to connectors 116 mounted on the main substrate 24.

When the eyepiece sensor 44*a*, mounted on the sensor FPC 44, detects that the user is looking through the eyepiece window 16, the live view display switches from the display part 10 to the finder internal display panel 35, as previously mentioned. As illustrated in FIG. 4A, the sensor FPC 44 is positioned so that it presses against the backside of the sensor window 15, which is affixed to the outer cover 45, an exterior component, through adhesion, and it is fastened to the window frame of the sensor window 15 using screws.

The lens front cover 38 is secured to the inner cover 46 by screws at a flange portion 38*a*, formed on its outer periphery. The outer cover 45 is then fastened to the inner cover 46 with screws. Consequently, the optical unit 12*a* is enclosed by both the outer cover 45 and the inner cover 46.

Furthermore, as illustrated in FIG. 4A, an arc portion 46*a*, serving as an appearance-forming portion, is provided on the +Z side of the inner cover 46. Inside the arc portion 46*a*, an opening 46*b* is formed to allow the passage of the finder FPC 39. As illustrated in FIGS. 2A and 3B, the arc portion 46*a* remains unexposed when the finder part 12 is in either its stored or extended position, but it becomes exposed to form the exterior appearance when the finder part is rotated, serving as a cover to hide the internal structure.

Additionally, at the upper end of the arc portion 46*a* of the inner cover 46, an FPC positioning restriction portion 46*d*, which serves as the first substrate restriction portion, is provided. Furthermore, near the opening 46*b* of the inner cover 46, an FPC bending restriction portion 46*c*, which serves as the second substrate restriction portion, is provided. Further details of the FPC positioning restriction portion 46*d* and the FPC bending restriction portion 46*c* will be discussed later.

On the −Z side exterior surface of the outer cover 45, a rubber eyepiece cover 47, serving as a cushioning component that contacts the user's face when looking through the eyepiece window 16, is fastened with screws.

As illustrated in FIG. 5A, the lens group 36*a* is composed of multiple lenses. The outer diameter of the lens closest to the finder internal display panel 35 (the panel-side lens) is D1, and the outer diameter of the lens closest to the eyepiece window 16 (the window-side lens) is D2. The outer diameters D1 and D2 of the panel-side and window-side lenses are larger than that of the finder internal display panel 35 to magnify the image displayed on the panel. Additionally, the outer diameter D1 is smaller than the outer diameter D2. Thus, the upper portion of the panel-side lens holding section of the lens holder 36 is formed to be smaller in external dimensions by half the difference in outer diameter (D2−D1) compared to the window-side lens holding section. Moreover, the fixed barrel 37, which covers the lens holder 36, is formed such that a space 37*a* is created above (on the +Y side of) the panel-side lens. The space 37*a* has a height of half the difference (D2−D1) in the Y direction, and it also has depth in the Z direction and width in the X direction.

The dashed line in FIG. 5B indicates the area where the window-side lens, which has the maximum outer diameter D2 in the lens group 36*a*, is located when viewed from the direction in which the finder optical axis F extends (the −Z direction). The fixed barrel 37 has arcuate side portions R2 that run along the left and right sides of the window-side lens (lens holder 36). These arcuate side portions R2 are symmetrically formed with respect to the finder optical axis F. On the outside of the fixed barrel 37, above (on the +Y side of) the finder optical axis F, a triangular space 37*c* is formed, surrounded by the arcuate side portions R2, the extended surfaces of the top surface 37*d* of the fixed barrel 37, and the vertical surfaces 37*b* that extend vertically along the outer edges of the arcuate side portions R2.

Figure 9C:
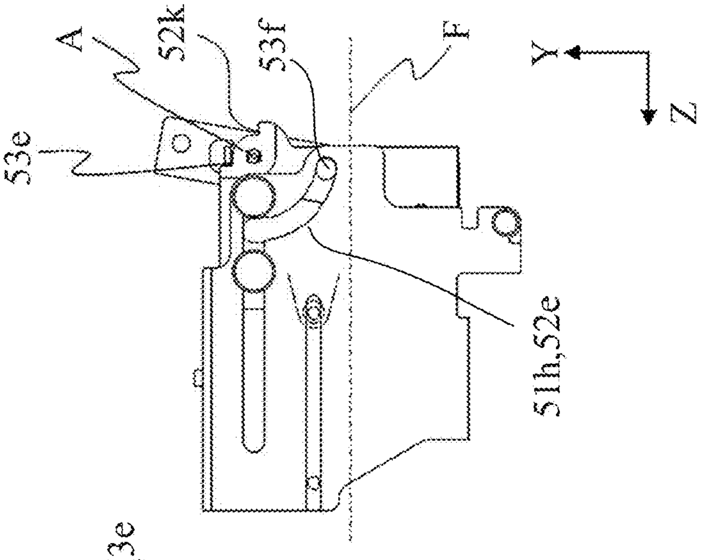
FIGS. 9A to 9C are side views of the finder support mechanism in the stored, extended, and rotated states of the finder unit.
Figure 9B:
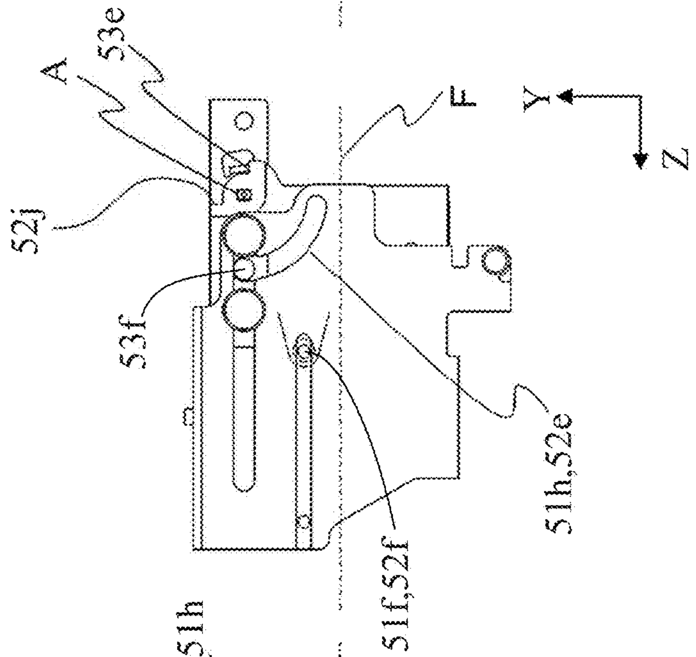
Figure 9A:
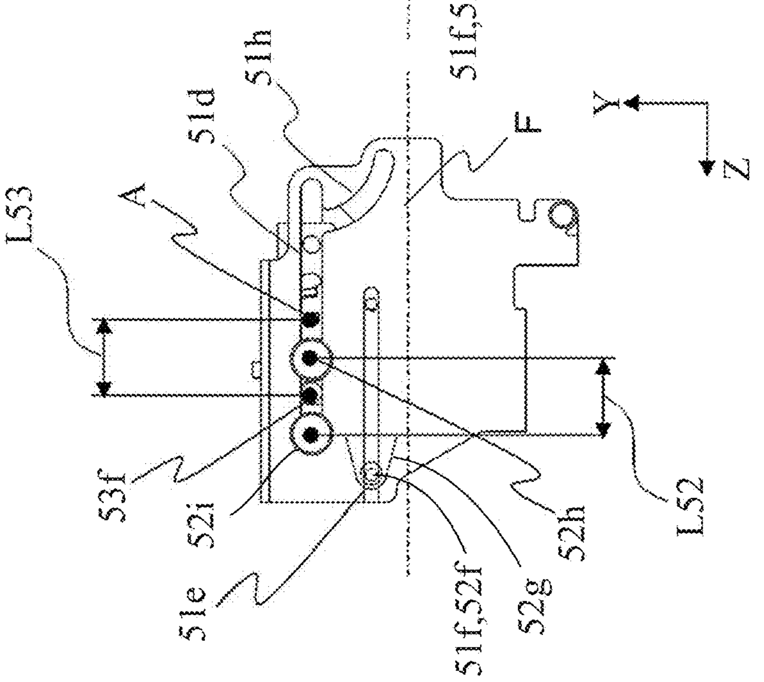

FIG. 8 illustrates an exploded view of the finder support mechanism 50, which supports the finder part 12. The finder support mechanism 50 is held by the camera 1 and supports the finder part 12, allowing it to move among the stored position, drawing position, and rotated position. FIGS. 9A, 9B and 9C illustrate the finder support mechanism 50 from the +X side when the finder part 12 is in the stored, drawn, and rotated states, respectively.

As illustrated in FIG. 8, the finder support mechanism 50 consists of a fixed plate (fixed portion member) 51, a linear plate (linear member) 52, a rotation plate (rotation member) 53, and a flip member 54. The fixed plate 51 is made by pressing a metal plate and serves as the structural frame of the finder support mechanism 50. The fixed plate 51 has a first wall portion 51*a*, a second wall portion 51*b*, and a third wall portion 51*c*.

Figure 12A:
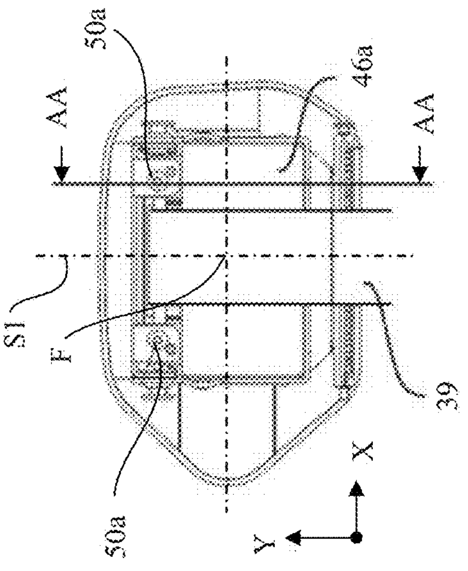
FIGS. 12A to 12D are side views and cross-sectional views of the finder unit.
Figure 13A:
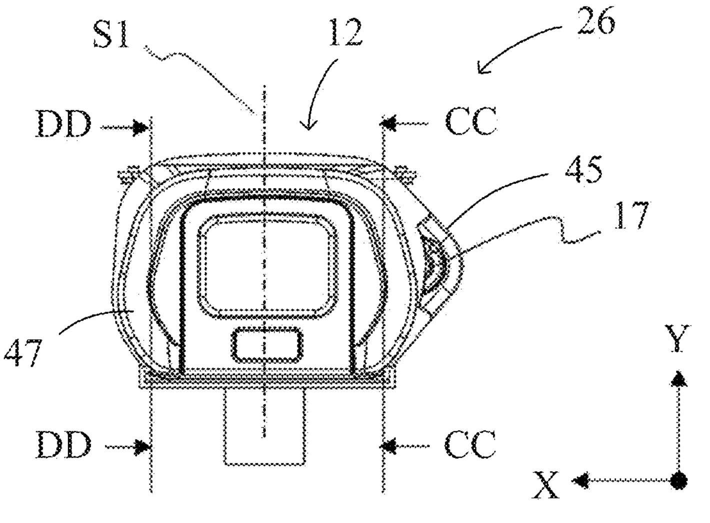
FIGS. 13A to 13C are a rear view and cross-sectional views of the finder unit.

The first wall portion 51*a* and the second wall portion 51*b* extend in the Z direction and are a pair of side wall portions that face each other in the X direction. The first wall portion 51*a* is positioned on the side closer to the diopter adjustment dial 17 relative to the finder optical axis F in the X direction, as illustrated in FIG. 1B. The second wall portion 51*b* is positioned on the opposite side of the finder optical axis F from the diopter adjustment dial 17 in the same direction. In other words, the second wall portion 51*b* is positioned on the opposite side of the diopter adjustment dial 17 from the finder optical axis F in the stored state of the finder part 12, as illustrated in FIGS. 12A and 13A, which will be discussed later, and relative to the plane S1 that includes the finder optical axis F and is parallel to the YZ plane.

As illustrated in FIGS. 9A to 9C, the third wall portion 51*c* is located below the finder optical axis F (on the −Y side) and is a connecting part parallel to the XZ plane, connecting the first wall portion 51*a* and the second wall portion 51*b* at both ends in the X direction. In this way, the fixed plate 51 forms a U-shape when viewed from the Z direction, with the side wall portions (51*a*, 51*b*) connected below the finder optical axis F by the connecting part (51*c*).

In the state where the top cover unit 22 and the finder unit 26, illustrated in FIG. 3B, are fixed to each other with screws 27, the fixed plate 51 is fastened to the accessory shoe holding member 33 with screws 27. As a result, the fixed plate 51 forms a rectangular frame shape together with the accessory shoe holding member 33 when viewed from the Z direction, providing high rigidity. Since a high-rigidity shoe engagement member 30 is also fixed to the accessory shoe holding member 33, the rigidity of the fixed plate 51 is further increased.

The fixed portion members of the camera 1, such as the top cover unit 22, the accessory shoe holding member 33, the internal structural member 20, and the main substrate 24, constitute the "main body" relative to the finder part 12, which is a movable unit.

A linear rail 51*d* extending linearly in the drawing/storage direction (Z direction) of the linear plate 52 is formed on the first wall portion 51*a* and the second wall portion 51*b*. Additionally, a concave portion 51*e* extending linearly in the drawing/storage direction are formed on the first wall portion 51*a* and the second wall portion 51*b*. Click holes 51*f* are formed at the front and rear ends of the concave portion 51*e*.

A concave shape portion 51*g* is formed at the −Z direction end of the first wall portion 51*a*. The inner space of this concave shape portion 51*g* accommodates a diopter adjustment dial 17 when a finder part 12 is in the stored state.

On the second wall portion 51*b*, an arc-shaped rail (hereinafter referred to as arc rail) 51*h* branching from the middle of the linear rail 51*d* to the −Y direction is formed. The arc rail 51*h* extends arcuately along the circumferential direction centered on rotation axis A illustrated in FIG. 2C from the middle of the linear rail 51*d*. The arc rail 51*h* is formed only on the second wall portion 51*b* and not on the first wall portion 51*a*.

The linear plate 52 is a member manufactured by pressing a metal plate and is disposed inside the fixed plate 51. The linear plate 52 is held by the fixed plate 51 such that it can move straight only in the drawing direction (−Z direction). The linear plate 52 has a first wall portion 52*a*, second wall portion 52*b*, and third wall portion 52*c*.

The first wall portion 52*a* and the second wall portion 52*b* are a pair of side wall portions facing each other in the X direction and extending in the Z direction. In the X direction, the first wall portion 52*a* is positioned closer to the diopter adjustment dial 17 illustrated in FIG. 1B relative to the finder optical axis F. In the same direction, the second wall portion 52*b* is positioned on the opposite side of the diopter adjustment dial 17 relative to the finder optical axis F.

The third wall portion 52*c* is a connecting portion parallel to the XZ plane and located below (on the −Y side) of the finder optical axis F, connected to the first wall portion 52*a* and the second wall portion 52*b* at both ends in the X direction. Thus, the linear plate 52 has a U-shaped profile in the Z direction when viewed.

A hole 52*d*, which serves as a bearing for a rotation axis A that functions as the rotation center of the rotating plate 53, is formed in both the first wall portion 52*a* and the second wall portion 52*b*. An arc rail 52*e*, corresponding to the arc rail 51*h* of the fixed plate 51, is formed in the second wall portion 52*b*. The first wall portion 52*a* and the second wall portion 52*b* are provided with a plate spring portion 52*g* that protrude in the +Z direction. A convex portion 52*f* provided at the front end of the plate spring portion 52*g* elastically engages with the concave portion 51*e* and the click hole 51*f* of the fixed plate 51.

Furthermore, a pair of linear guide pins 52*h*, 52*i*, which serve as guided members, are provided on both the first wall portion 52*a* and the second wall portion 52*b*. The two sets of linear guide pins 52*h*, 52*i* are arranged symmetrically with respect to the finder optical axis F in the X direction. Each set of linear guide pins 52*h*, 52*i* is arranged at a predetermined interval in the drawing/storage direction. The linear guide pins 52*h*, 52*i* penetrate through the linear rail 51*d* when the linear plate 52 is assembled to the fixed plate 51, and are fixed to the first wall portion 52*a* and the second wall portion 52*b* by caulking. The linear guide pins 52*h*, 52*i* can move along the linear rail 51*d*, thereby guiding the linear plate 52 to move in the drawing/storage direction relative to the fixed plate 51.

At this time, the sliding between the convex portion 52*f* of the linear plate 52 and the concave portion 51*e* of the fixed plate 51 provides the user with a tactile feel when operating to move the finder part 12 in the drawing/storage direction. This is because the frictional force between the convex portion 52*f* and the concave portion 51*e* acts as a resistance force during the movement, thereby generating the tactile sensation. Furthermore, the engagement between the convex portion 52*f* and the click hole 51*f* provides the user with a click-stop feel at the stored position or the drawn position of the finder part 12.

The rotating plate 53 is a component manufactured by pressing a metal plate and is arranged inside the linear plate 52. The rotating plate 53 holds the finder part 12 and is rotatably supported by the linear plate 52 around the rotation axis A as illustrated in FIG. 9C. The rotating plate 53 has a first wall portion 53*a*, a second wall portion 53*b*, and a third wall portion 53*c*.

The first wall portion 53*a* and the second wall portion 53*b* are a pair of side walls extending in the Z direction and facing each other in the X direction. The first wall portion 53*a* is positioned on the side closer to the diopter adjustment dial 17 illustrated in FIG. 1B with respect to the finder optical axis F in the X direction. The second wall portion 53*b* is positioned on the side opposite to the diopter adjustment dial 17 with respect to the finder optical axis F in the same direction.

The third wall portion 53*c* is a connecting portion located above the finder optical axis F (+Y direction) and parallel to the XZ plane, and is connected to the first wall portion 53*a* and the second wall portion 53*b* at both ends in the X direction. In this way, the rotating plate 53 has an inverted U-shape when viewed from the Z direction, as the pair of side walls (53*a*, 53*b*) are connected above the finder optical axis F by the connecting portion (53*c*). The combination of the linear plate 52 and the rotating plate 53 forms a rectangular frame shape when viewed from the Z direction, increasing their rigidity.

Thus, the fixed plate 51, the linear plate 52, and the rotating plate 53 each have a pair of side wall portions on both sides in the X direction where the rotation axis A extends. The pair of side wall portions (52*a*, 52*b*) of the linear plate 52 are arranged inside the pair of side wall portions (51*a*, 51*b*) of the fixed plate 51, and the pair of side wall portions (53*a*, 53*b*) of the rotating plate 53 are arranged inside the pair of side wall portions of the linear plate 52.

The first wall portion 53*a* and the second wall portion 53*b* of the rotating plate 53 are arranged in the space 37*c* formed outside the fixed barrel 37 of the finder part 12, as illustrated in FIG. 5B. This arrangement helps suppress the increase in size in the X direction caused by the installation of the rotating plate 53. Additionally, the third wall portion 53*c* of the rotating plate 53 is positioned in the space 37*a* formed above the fixed barrel 37, as illustrated in FIG. 5A. This placement helps suppress the increase in size in the +Y direction due to the addition of the rotating plate 53.

Furthermore, a hole 53*d*, which serves as bearings for the rotation axis A that forms the rotation center of the rotating plate 53, are formed in the first wall portion 53*a* and the second wall portion 53*b* in such a way that they are coaxial with the hole 52*d* of the linear plate 52. In the vicinity of the hole 53*d* in the first wall portion 53*a* and the second wall portion 53*b*, a standing bent portion 53*e* is formed, bent in the X direction along the rotation axis A. Moreover, a rotation axis pin 53*f* is fixed by caulking while passing through the dish spring 53*g*, the hole 52*d*, and the hole 53*d* of the linear plate 52, in the first and second wall portions 53*a*, 53*b*. In this way, the rotation axis A, which serves as the rotation center of the rotating plate 53, is formed by the rotation axis pin 53*f* fixed to the rotating plate 53.

The dish spring 53*g* is positioned between the rotation axis pin 53*f* and the first and second wall portions 53*a*, 53*b*, in the state where it is compressed and bent in the direction of the rotation axis A, pressing these wall portions against the first and second wall portions 52*a*, 52*b* of the linear plate 52. As a result, frictional force is generated between the first wall portions 52*a*, 53*a* and the second wall portions 52*b*, 53*b*. This frictional force provides the user with a tactile feel when rotating the finder part 12 and allows the rotating plate 53 to be held at any rotational angle within its rotation range.

When the rotating plate 53 rotates upward or downward, as illustrated in FIGS. 9B and 9C, the standing bent portion 53*e* contacts the rotation restriction portions 52*j*, 52*k* of the linear plate 52, limiting further upward or downward rotation of the rotating plate 53. In other words, the rotation range of the rotating plate 53 is restricted by the rotation restriction portions 52*j*, 52*k*.

In this embodiment, both rotation axis pins 53*f* are provided with disc springs 53*g*. However, it is also possible to provide a dish spring 53*g* for only one of the rotation axis pins 53*f*. Furthermore, this embodiment explains the case where the rotating plate 53 is held in its rotated position by the frictional force generated between the first wall portions 52*a*, 53*a* and the second wall portions 52*b*, 53*b*. However, it is also possible to hold the rotated position of the rotating plate 53 by having a convex portion formed on the rotating plate 53 engage with concave portions formed on the linear plate 52 at predetermined rotational angles.

In the state where the fixed plate 51, the linear plate 52, and the rotating plate 53 are assembled, the rotation axis pin 53*f*, which penetrates the linear rail 51*d* of the fixed plate 51 and the arc rail 52*e* of the linear plate 52, is fixed to the second wall portion 53*b* of the rotating plate 53 by caulking. The rotation axis pin 53*f* can move along the linear rail 51*d* when the linear plate 52 and the rotating plate 53 move in the drawing/storage direction, and can move along the arc rails 51*h*, 52*e* when the rotating plate 53 rotates around the rotation axis A. When the rotating plate 53 rotates, the rotation axis pin 53*f* engages with the arc rail 51*h*, preventing the linear plate 52 and the rotating plate 53 from moving in the drawing/storage direction while guiding the rotation of the rotating plate 53.

The flip member 54 is positioned below (in the −Y direction) the third wall portion 51*c* of the fixed plate 51. The flip member 54 is rotatably supported by the fixed plate 51 via a shaft 54*a* and is biased upward (in the +Y direction) by the biasing force of the torsion spring 54*b* against the linear plate 52.

The linear plate 52 moves from the stored position illustrated in FIG. 9A to the drawing position illustrated in FIG. 9B by the linear guide pins 52*h*, 52*i* moving along the linear rail 51*d* of the fixed plate 51. At this time, as previously described, the convex portion 52*f* provided on the plate spring portion 52*g* of the linear plate 52 slides against the concave portion 51*e* of the fixed plate 51, providing the user with tactile feedback during the pull-out operation. In the drawn-out state, the linear guide pin 52*h* is located at the −Z end of the linear rail 51*d*, and the rotation axis pin 53*f* of the rotating plate 53 is positioned at the junction with the arc rail 51*h* in the middle of the linear rail 51*d*.

From the drawing position, the rotating plate 53 rotates to the rotated position illustrated in FIG. 9C as the rotation axis pin 53*f* moves along the arc rail 51*h* of the fixed plate 51 to its end, rotating around the rotation axis A. During this rotation, as previously described, the dish spring 53*g* presses the first and second wall portions 53*a*, 53*b* of the rotating plate 53 against the first and second wall portions 52*a*, 52*b* of the linear plate 52, providing the user with rotational feedback during the rotation operation.

Here, the concave portion 51*e* must be formed at a location away from the rotation axis A on the fixed plate 51, since it needs to avoid the arc rail 51*h*. In other words, the convex portion 52*f* provided on the plate spring portion 52*g* of the linear plate 52, which engages with the concave portion 51*e*, is positioned at a distance from the rotation axis A. If one were to attempt to use the biasing force of the plate spring portion 52*g* to generate the rotational feedback from the drawn-out state to the rotated state, the plate spring portion 52*g* would need to be larger, resulting in a larger rotational trajectory of its tip. Consequently, the concave portion 51*e* that engages with the convex portion 52*f* would need to be formed in a larger circular arc, leading to an increase in the size of the fixed plate 51.

In contrast, in this embodiment, the finder support mechanism 50 is composed of three parts: the fixed plate 51, the linear plate 52, and the rotating plate 53. The mechanism that generates the tactile feedback between the stored state and the drawn-out state, and the mechanism that generates the feedback between the drawn-out state and the rotated state, are positioned at different locations. This helps to suppress the size increase of the fixed plate 51, which serves as the foundation of the finder support mechanism 50.

The outer diameter of the linear guide pins 52*h*, 52*i* is set slightly smaller than the width (height in the Y direction) of the linear rail 51*d* of the fixed plate 51. This allows the linear guide pins 52*h*, 52*i* to move smoothly within the linear rail 51*d*. The distance L52 between the linear guide pins 52*h*, 52*i* in the Z direction, as illustrated in FIG. 9A, is appropriately set to prevent excessive play of the linear plate 52.

Additionally, from the perspective of expanding the rotation range of the finder part 12, it is preferable to position the rotation axis A as close to the −Z direction as possible, to prevent the finder part 12 from interfering with the top cover unit 22. Since the linear plate 52 and the rotating plate 53 are connected with the dish spring 53*g* flexed in the direction extending along the rotation axis A, there is a tendency for the linear plate 52 to rotate together with the rotating plate 53 as it rotates. To suppress this movement (i.e., to reduce the rotational moment acting on the linear plate 52), it is preferable to position the rotation axis A and the linear guide pin 52*h* as close as possible.

Furthermore, since the rotation axis pin 53*f* rotates integrally with the rotating plate 53 around the rotation axis A, the arc rails 51*h*, 52*e* corresponding to the rotational trajectory of the rotation axis pin 53*f* are formed on the fixed plate 51 and the linear plate 52. At this time, as illustrated in FIG. 9A, if the distance L53 between the rotation axis A and the rotation axis pin 53*f* (i.e., the rotational radius) is too long, a large portion would be required to form the arc rails 51*h*, 52*e* on the fixed plate 51 and the linear plate 52. Thus, to avoid increasing the size of the fixed plate 51 and the linear plate 52, the distance L53 must be set to an appropriate value.

Considering all these factors, the rotation axis A, the linear guide pin 52*h*, rotation axis pin 53*f*, and linear guide pin 52*i* are arranged in this order in the +Z direction in both the stored and drawn-out states. This configuration allows the rotation axis A, the linear guide pins 52*h*, 52*i*, and the rotation axis pin 53*f* to perform their respective functions while achieving size reduction in the Z direction. If the rotation axis pin 53*f* were positioned in the −Z direction relative to the linear guide pin 52*h*, it would be difficult to shorten the distance between the rotation axis A and the linear guide pin 52*h*. Conversely, if the rotation axis pin 53*f* were positioned in the +Z direction relative to the linear guide pin 52*i*, the distance L53 would become too long, requiring a larger area on the fixed plate 51 and the linear plate 52 to form the arc rails 51*h*, 52*e*.

Figure 10:
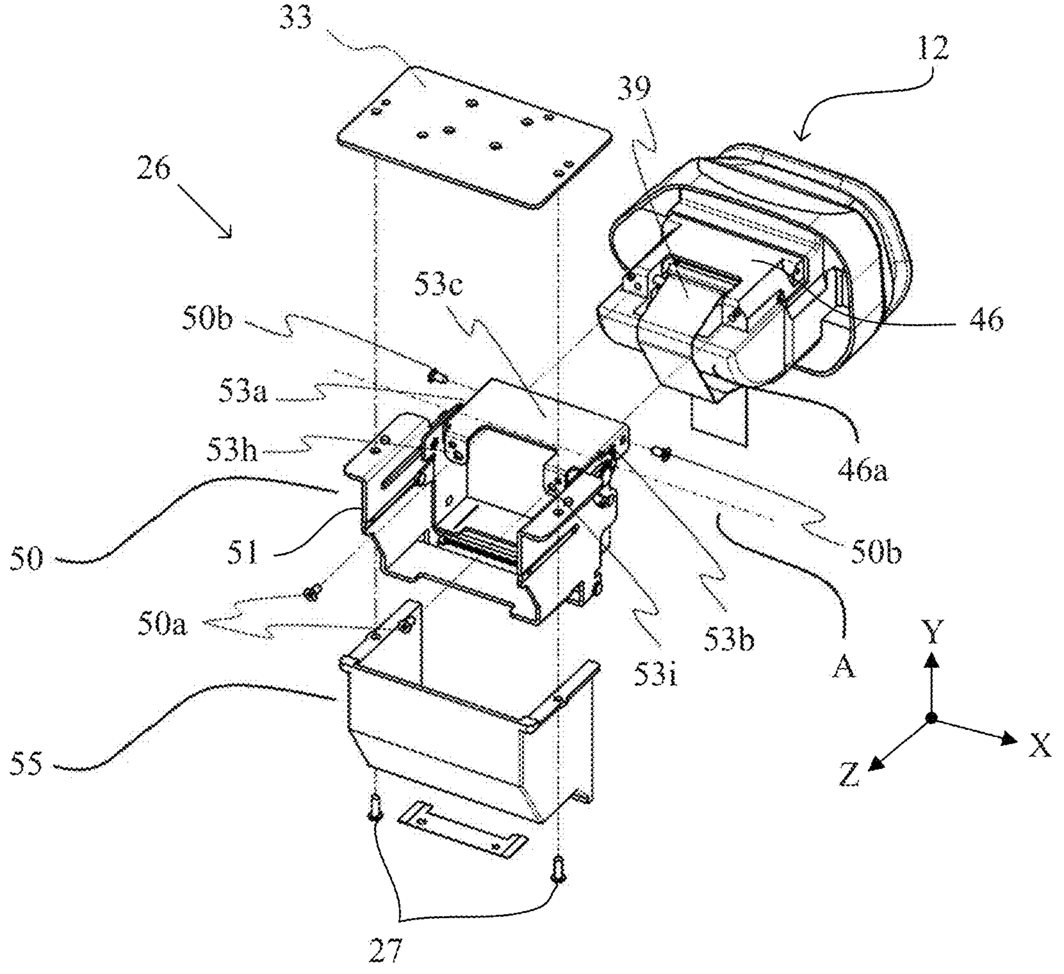
FIG. 10 is an exploded perspective view of the finder unit.

FIG. 10 illustrates an exploded view of the finder unit 26. The finder unit 26 includes the previously mentioned finder part 12 and the finder support mechanism 50, as well as a support mechanism holder 55 that houses and secures the finder support mechanism 50. The support mechanism holder 55 and the fixed plate 51 are fastened to the accessory shoe holding member 33 of the accessory shoe 9 using screws 27.

Figure 11A:
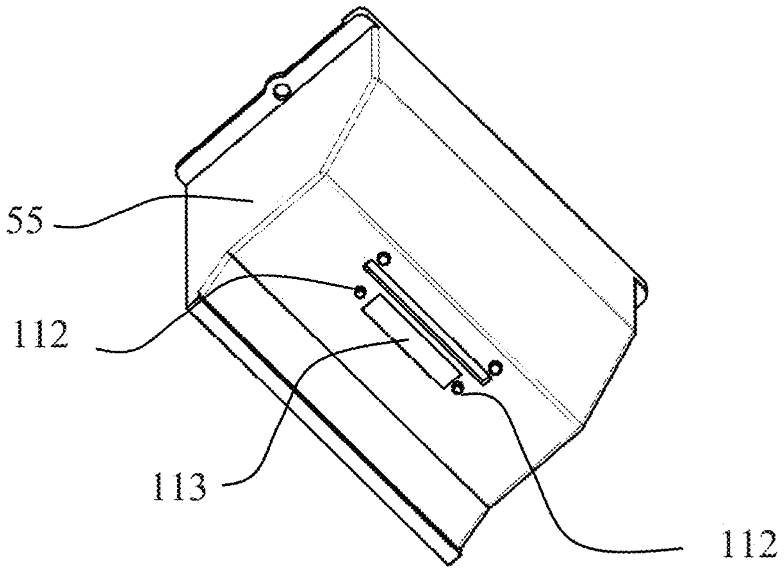
FIGS. 11A and 11B are perspective views of a holder of the finder support mechanism.

FIG. 11A illustrates the support mechanism holder 55 viewed from the lower oblique side. Two positioning protrusions 112 are formed on the bottom surface of the support mechanism holder 55, and double-sided tape 113 is applied.

Figure 11B:
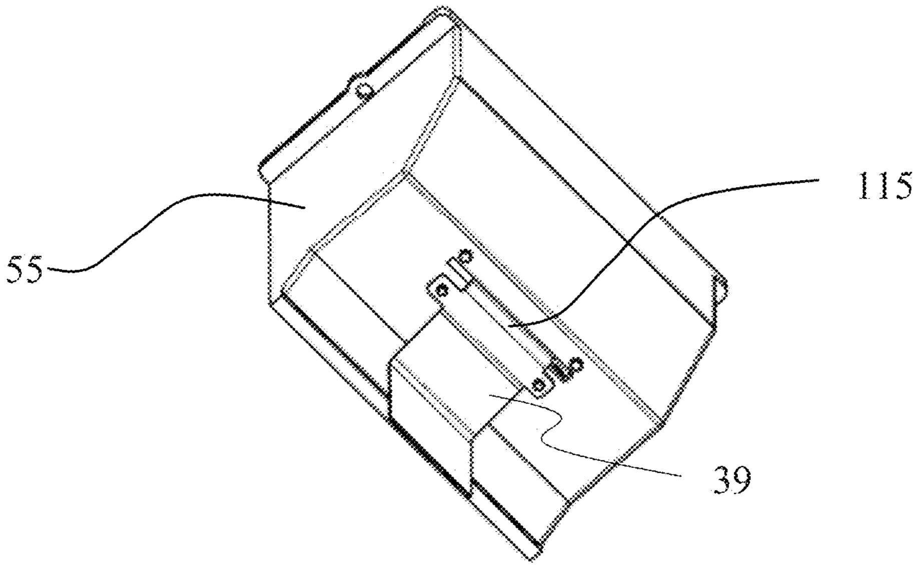

FIG. 11B illustrates the support mechanism holder 55 with the finder FPC 39 assembled on its bottom surface. The finder FPC 39 is positioned relative to the support mechanism holder 55 by inserting the two positioning protrusions 112 of the support mechanism holder 55 into the two positioning holes formed on the finder FPC 39. In this state, the finder FPC 39 is secured to the support mechanism holder 55 by the double-sided tape 113. The portion of the finder FPC 39 that is attached to the support mechanism holder 55 with the double-sided tape 113 corresponds to the second fixed portion, and is referred to as an attachment portion 115 in the following description.

As illustrated in FIGS. 10 and 8, the rotating plate 53 includes not only the previously mentioned first to third wall portions 53*a* to 53*c* but also a fourth wall part 53*h* and a fifth wall part 53*i*. The fourth wall part 53*h* and the fifth wall part 53*i* are formed by bending downward so that portions near both ends in the X direction at the +Z direction ends of the third wall portion 53*c* are parallel to the XY plane. As illustrated in FIG. 10, the fourth wall part 53*h* and the fifth wall part 53*i* are each coupled to the inner cover 46 of the finder part 12 by screws 50*a*. Additionally, the first wall portion 53*a* and the second wall portion 53*b* are also coupled to the inner cover 46 by screws 50*b*, respectively. Thus, the rotating plate 53 is fixed to the finder part 12.

Figure 12B:
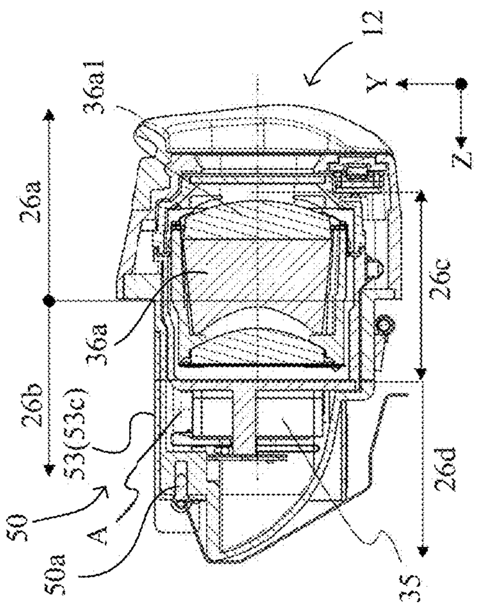
Figure 12C:
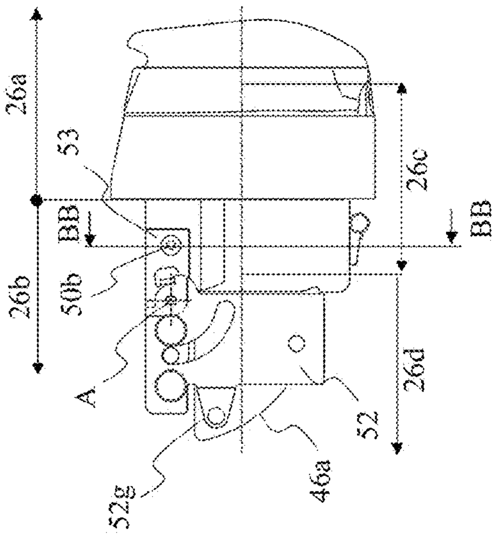
Figure 12D:
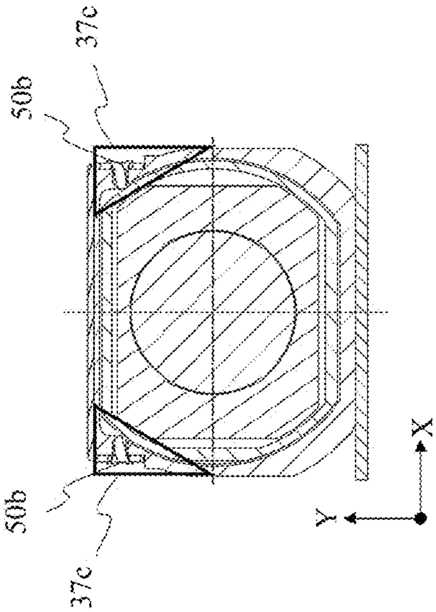

FIG. 12A illustrates a view of the finder unit 26 from the +Z direction, omitting the depiction of the fixed plate 51 and the support mechanism holder 55. FIG. 12B illustrates a sectional view along a line AA-AA in FIG. 12A, passing through the center of one of the two screws 50*a*. FIG. 12C illustrates a view of the finder unit 26 from the +X direction, omitting the depiction of the fixed plate 51 and the support mechanism holder 55. FIG. 12D illustrates a sectional view along a line BB-BB in FIG. 12C, passing through the centers of two screws 50*b*.

As illustrated in FIGS. 12B and 12C, the region of the finder unit 26 in the X direction is defined as follows: first, the area that constitutes the appearance of the camera 1 (exposed to the outside from the camera 1) within the finder unit 26 in the stored state is designated as the first appearance region 26*a*, and the area stored within the camera 1 (not exposed to the outside from the camera 1) is designated as the first storage region 26*b*. Furthermore, the area where the lens holder 36 moves in the +Z direction is designated as the lens side region 26*c*, and the area on the +Z side of the lens side region 26*c* is designated as the panel side region 26*d*.

As illustrated in FIG. 12A, the two screws 50*a* are positioned such that they do not overlap with the finder FPC 39 when viewed from the +Z direction. Moreover, in the stored state, the two screws 50*a* are positioned symmetrically with respect to the plane S1 parallel to the YZ plane, including the finder optical axis F. Furthermore, as illustrated in FIG. 12B, the two screws 50*a* are located on the +Y side of the finder optical axis F and are positioned in the panel side region 26*d* in the Z direction.

As illustrated in FIG. 12C, the linear plate 52 is positioned in the first storage region 26*b* and the panel side region 26*d* in the Z direction in the stored state. By positioning the linear plate 52 in this manner, the width of the linear plate 52 in the X direction can be made smaller compared to when it is positioned in the lens side region 26*c*, enabling miniaturization of the finder support mechanism 50.

Additionally, as illustrated in FIG. 12C, the plate spring portion 52*g* of the linear plate 52 is positioned inward (on the −Z side) relative to the arc portion 46*a* of the inner cover 46 when viewed from the +X direction in the stored state. By positioning it in this way, it is possible to accommodate the concave portion 51*e* provided on the fixed plate 51 in correspondence with the convex portion 52*f* of the plate spring portion 52*g*, as illustrated in FIG. 8, inward of the arc portion 46*a* of the inner cover 46 when viewed from the +X direction. As a result, the space below (on the −Y side) of the arc portion 46*a* can be used as an area for arranging the internal structural member 20 illustrated in FIG. 3A, thereby suppressing an increase in the size of the camera 1.

As illustrated in FIG. 12B, the third wall portion 53*c* of the rotating plate 53 is positioned such that it does not overlap with the lens 36*a*1, which is the lens closest to the eyepiece window 16 of the lens group 36*a*, when viewed from the +X direction where the rotation axis A extends.

As illustrated in FIG. 12C, the two screws 50*b* are located in the lens side region 26*c* in the Z direction, and as illustrated in FIG. 12D, they are positioned within the space 37*c*. In this manner, the finder part 12 (inner cover 46) is fixed to the rotating plate 53 of the finder support mechanism 50 by screws 50*a* and 50*b* at positions on both sides of the rotation axis A in the Z direction, allowing the finder part 12 to be firmly held by the rotating plate 53. Moreover, by arranging the screws 50*a* and 50*b* in this way, the size increase of the finder support mechanism 50 can be suppressed.

Figure 13B:
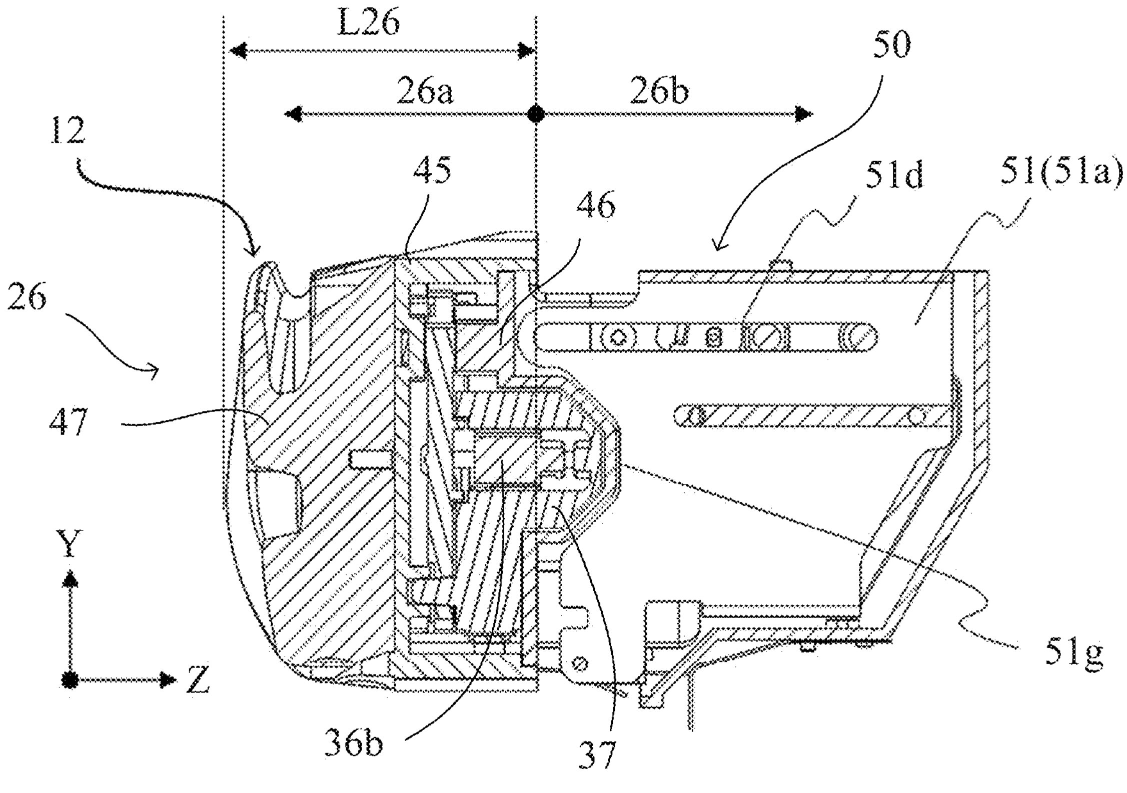
Figure 13C:
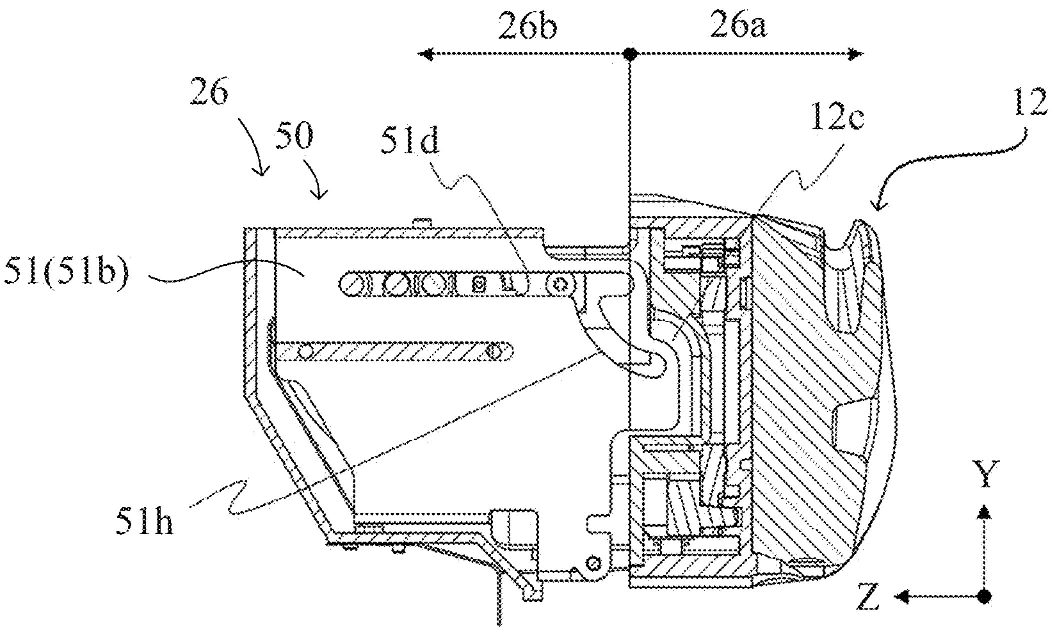

FIG. 13A illustrates the finder unit 26 viewed from the −Z direction. FIGS. 13B and 13C respectively illustrate cross-sections along a DD-DD line and a CC-CC line in FIG. 13A.

As illustrated in FIG. 13B, a linear rail 51*d* and a concave shape portion 51*g* are formed on the first wall portion 51*a* of the fixed plate 51. In the stored state, the length of the first appearance region 26*a* of the finder part 12 in the X direction (the protruding amount toward the outside) is referred to as the finder protrusion amount L26. A large finder protrusion amount L26 may interfere with the user when carrying the camera 1. In other words, to keep the finder protrusion amount L26 from becoming an obstacle when carrying the camera 1, it is necessary to place components related to diopter adjustment within the first storage region 26*b*.

Thus, in this embodiment, a concave shape portion 51*g* is formed below the linear rail 51*d* (on the −Y side) of the first wall portion 51*a*, and components such as the guide shaft 40, spring 41, and the portion of the fixed barrel 37 that houses these components are arranged within the first storage region 26*b*. As a result, the diopter adjustment dial 17 can be placed in the region overlapping with the first wall portion 51*a* of the fixed plate 51 when viewed from the −Z direction. By configuring the diopter adjustment dial 17 in this way, the increase in the size of the finder unit 26 in the X direction due to the provision of the diopter adjustment dial 17 can be suppressed.

Furthermore, as illustrated in FIG. 13C, a linear rail 51*d* and an arc rail 51*h* are formed on the second wall portion 51*b*, which is on the opposite side of the first wall portion 51*a* of the fixed plate 51. A part of the arc rail 51*h* is formed within the first appearance region 26*a*, enabling the miniaturization of the finder unit 26 in the X direction.

In this embodiment, no components related to diopter adjustment are placed on the side opposite the diopter adjustment dial 17 in the X direction of the finder part 12. As a result, it becomes possible to form a rail storage space 12*c* within the finder part 12 to extend the arc rail 51*h*. In other words, by forming the arc rail 51*h* only on the second wall portion 51*b*, which is on the opposite side of the diopter adjustment dial 17 in the X direction, it is possible to form the rail storage space 12*c* within the finder part 12 to accommodate the portion of the arc rail 51*h* protruding into the first appearance region 26*a*. With this configuration, the increase in the size of the finder unit 26 in the X direction can be suppressed.

Figure 14A:
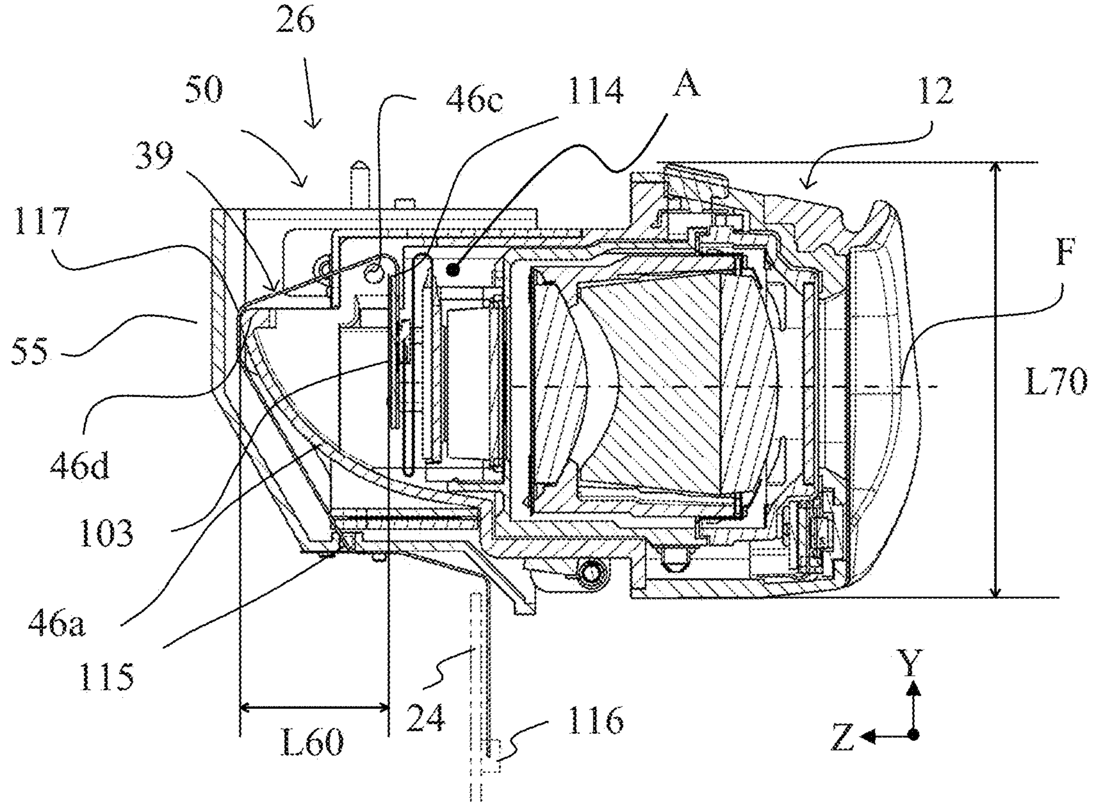
FIGS. 14A to 14C are cross-sectional views of the finder unit in the stored, extended, and rotated states.
Figure 14B:
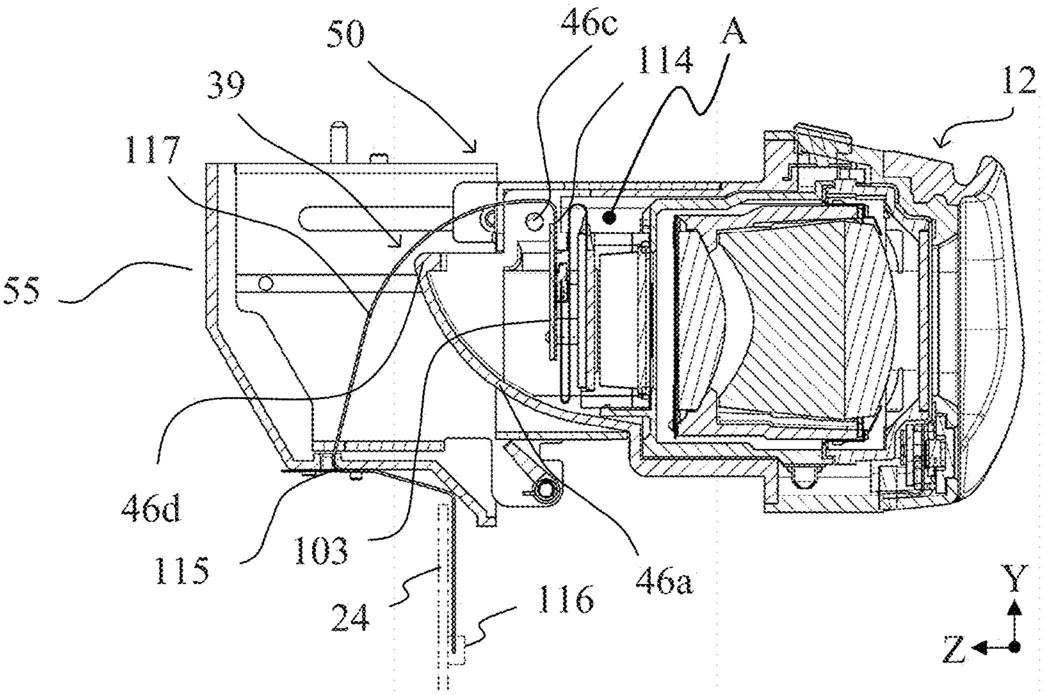
Figure 14C:
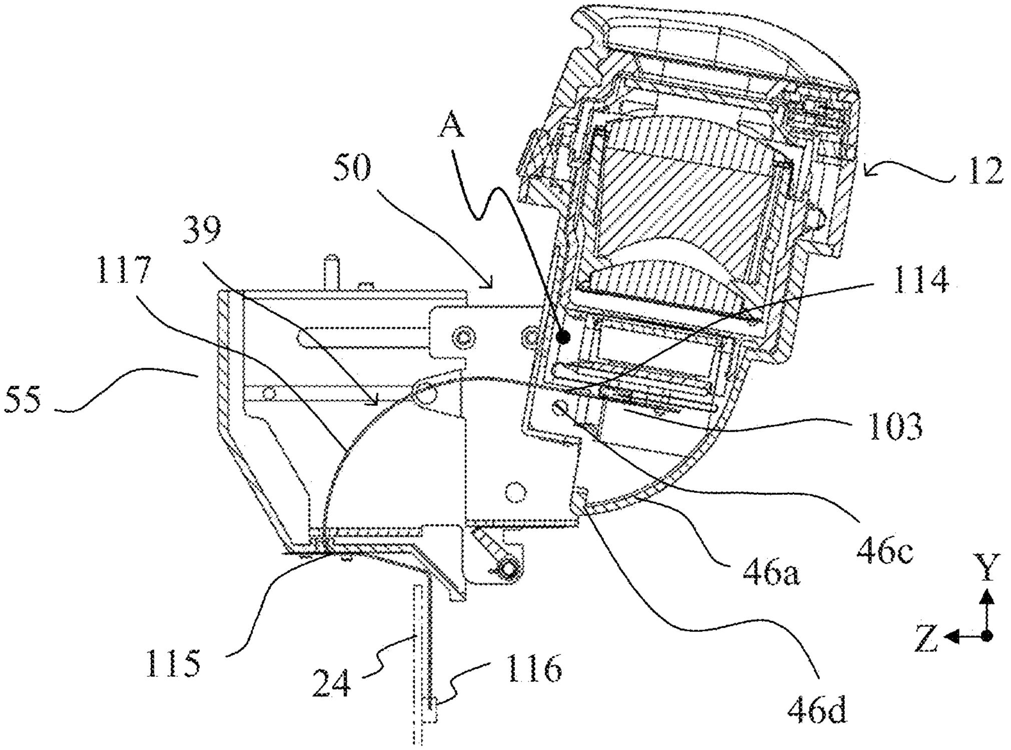

FIGS. 14A, 14B, and 14C respectively illustrate cross-sectional views of the finder unit 26 in its stored, drawn, and rotated states. These cross-sections are taken along a plane parallel to the YZ plane, passing through the finder optical axis F. In each of FIGS. 14A, 14B, and 14C, only the peripheral part of the connector 116 of the main substrate 24 is illustrated.

The section (hereinafter referred to as the "flexible portion") 117 of the finder FPC 39 between the previously mentioned boundary 114 and the attachment portion 115 can freely undergo bending deformation within the plane parallel to the YZ plane. As described earlier, the connector mounting part 102 of the finder FPC 39, where the reinforcing plate 103 is attached, is fixed to the fixed barrel 37, and the attachment portion 115 is fixed to the support mechanism holder 55. The boundary 114 corresponds to the end of the flexible portion 117 on the first fixed portion side, while the part of the flexible portion 117 adjacent to the attachment portion 115 corresponds to the end on the second fixed portion side.

Thus, as the finder part 12 moves between the stored position, drawn position, and rotated position, the connector mounting part 102, which includes the fixed barrel 37 that moves relative to the support mechanism holder 55, moves together with the finder part 12. During this movement, the attachment portion 115 remains fixed to the support mechanism holder 55. Consequently, the relative positional relationship between the connector mounting part 102 and the attachment portion 115 changes due to the bending deformation of the flexible portion 117.

Next, the bending deformation of the flexible portion 117 will be specifically explained. When the finder part 12 is in the stored position as illustrated in FIG. 14A, the flexible portion 117 of the finder FPC 39 has a first shape, where its intermediate position is pushed in the +Z direction by the FPC positioning restriction portion 46*d*, forming a convex shape in the +Z direction. At this time, as described later, the portion of the flexible portion 117 between the attachment portion 115 and the intermediate position assumes a shape tilted in the +Z direction.

When the finder part 12 is in the drawing position illustrated in FIG. 14B, the flexible portion 117 of the finder FPC 39 takes on a second shape, with the intermediate position being slightly concave in the +Z direction as the FPC positioning restriction portion 46*d* moves away (or approaches) from the intermediate position. As described later, the part of the flexible portion 117 between the attachment portion 115 and the intermediate position assumes a shape tilted in the −Z direction, and the entire flexible portion 117 is positioned in the −Z direction relative to the attachment portion 115.

When the finder part 12 is in the rotated position illustrated in FIG. 14C, the flexible portion 117 of the finder FPC 39 takes on a third shape, where the FPC positioning restriction portion 46*d* is significantly distant from the intermediate position and the boundary 114 rotates upward, forming a more gentle convex shape in the +Z direction than in the drawn state.

As the finder part 12 moves from the stored position toward the drawing position in the −Z direction (drawing direction), the connector mounting part 102 moves in the −Z direction while the attachment portion 115 remains fixed to the support mechanism holder 55.

Conversely, as the finder part 12 moves from the drawing position illustrated in FIG. 14B to the stored position illustrated in FIG. 14A in the +Z direction (storage direction), the connector mounting part 102 moves in the +Z direction while the attachment portion 115 remains fixed to the support mechanism holder 55. During this movement, the FPC positioning restriction portion 46*d*, which moves together with the finder part 12, restricts the deformation of the flexible portion 117 in the −Z direction (toward a shape other than the first shape) until it passes beyond the position of the attachment portion 115 without making contact with the flexible portion 117. In other words, when the flexible portion 117 deforms incorrectly in the −Z direction, the FPC positioning restriction portion 46*d* contacts it and guides it into the first shape, which is convex in the +Z direction. Once the FPC positioning restriction portion 46*d* passes the position of the attachment portion 115, it pushes the flexible portion 117 in the +Z direction, transforming it into the first shape.

In this manner, the FPC positioning restriction portion 46*d* functions to limit the free movement and deformation of the flexible portion 117 during the movement of the finder part 12 from the drawing position to the stored position, ensuring that the flexible portion 117 returns from the second shape at the drawing position to the first shape in the stored position. Without the FPC positioning restriction portion 46*d*, the flexible portion 117 could deform freely during the movement from the drawing position to the stored position, potentially causing issues such as getting pinched between other components.

Since the FPC positioning restriction portion 46*d* presses against the finder FPC 39, it is desirable for its shape to be smooth, such as an arc shape, rather than a sharp shape that could damage the finder FPC 39. Furthermore, because the FPC positioning restriction portion 46*d* is formed at the end of the arc portion 46*a* of the inner cover 46, as mentioned earlier, the number of components can be reduced and the structure simplified compared to when the FPC positioning restriction portion 46*d* is provided as a separate component.

Additionally, as mentioned earlier, the boundary 114 and the part adjacent to the attachment portion 115, which are both ends of the flexible portion 117, are located on opposite sides of the finder optical axis F (and the connector mounting part 102) in the Y direction. This ensures that the flexible portion 117 is sufficiently long and capable of deforming to accommodate the large movement of the finder part 12.

In the stored state illustrated in FIG. 14A, the FPC positioning restriction portion 46*d* is positioned on the +Z side (storage direction) relative to the attachment portion 115, and in the drawn state illustrated in FIG. 14B, it is positioned on the −Z side (drawing direction) relative to the attachment portion 115. As a result, between the stored and drawn states, the section of the flexible portion 117 between the attachment portion 115 and the intermediate position, where it can make contact with the FPC positioning restriction portion 46*d*, swings between a state tilted toward the +Z side (FIG. 14A) and a state tilted toward the −Z side (FIG. 14B), with the attachment portion 115 as the pivot point. In this way, the flexible portion 117 swings and follows the movement of the finder part 12 in the drawing and storage directions. This simple configuration of adding the FPC positioning restriction portion 46*d* helps stabilize the behavior of the flexible portion 117.

As illustrated in FIG. 14A, the distance in the Z direction from the FPC positioning restriction portion 46*d* to the boundary 114 is denoted as L60. L60 represents the length of the space in the Z direction where the flexible portion 117 of the finder FPC 39 is accommodated in the stored state. In this embodiment, L60 is set smaller than the drawable amount of the finder part 12 from the stored position to the drawing position. This allows the finder unit 26 to be compact in the Z direction when in the stored state.

When the finder part 12 rotates counterclockwise around the rotation axis A from the drawing position to the rotated position illustrated in FIG. 14C, the connector mounting part 102 rotates in the same direction around the rotation axis A while the attachment portion 115 remains fixed to the support mechanism holder 55. During this time, the FPC positioning restriction portion 46*d* moves away from the flexible portion 117.

On the other hand, when the finder part 12 rotates clockwise around the rotation axis A from the rotated position to the drawing position, the connector mounting part 102 rotates in the same direction around the rotation axis A while the attachment portion 115 remains fixed to the support mechanism holder 55. The FPC positioning restriction portion 46*d* also rotates clockwise around the rotation axis A together with the finder part 12. During this time, as the FPC positioning restriction portion 46*d* approaches the flexible portion 117, it functions to limit the free movement and deformation of the flexible portion 117, making it easier for the flexible portion 117 to return to the second shape seen in the drawn state. In other words, the FPC positioning restriction portion 46*d* prevents the flexible portion 117 from deforming into any shape other than the second shape as it moves from the rotated position to the drawing position.

Thus, during the series of movements from the rotated position to the stored position, the FPC positioning restriction portion 46*d* effectively limits the movement and deformation of the flexible portion 117 of the finder FPC 39, ensuring that the flexible portion 117 transitions from the third shape, through the second shape, and finally back to the first shape.

When viewed from the first direction in the X direction, the boundary 114 on one end of the flexible portion 117, in the second direction Y direction, is positioned on the same side as the rotation axis A relative to the finder optical axis F. Specifically, the boundary 114 and the adjacent portion to the rotation axis A and the attachment portion 115 are positioned on opposite sides in the Y direction across the finder optical axis F (and connector mounting part 102) from each other. Moreover, the boundary 114 is located closer to the rotation axis A than the portion adjacent to the attachment portion 115. As a result, the rotational trajectory of the boundary 114 around the rotation axis A when the finder part 12 rotates from the drawing position to the rotated position becomes smaller. Consequently, it is possible to reduce the length of the flexible portion 117 required to follow the movement of the finder part 12, thereby improving the stability of the movement of the flexible portion 117.

As illustrated in FIG. 14A, when the size (outer dimensions) of the finder part 12 in the Y direction is L70, the entire flexible portion 117 from the boundary 114 to the attachment portion 115 and the FPC positioning restriction portion 46*d* are positioned within the range of L70 in the Y direction. This allows the finder unit 26 to be constructed in a smaller size.

Additionally, as mentioned earlier, the inner cover 46 is provided with an FPC bending restriction portion 46*c*. The FPC bending restriction portion 46*c* supports the finder FPC 39 when excessive force is applied near the boundary 114 of the finder part 12 during movement and rotation between the stored position, drawing position, and rotated position, thereby reducing the force (stress) acting near the boundary 114 of the finder FPC 39 and preventing problems such as wire breakage in the vicinity of the boundary 114.

According to this embodiment as described above, it is possible to restrict the movement and deformation of the finder FPC 39 in response to the movement and rotation of the finder part 12, thereby avoiding excessive loads and pinching of the finder FPC 39.

Furthermore, embodiments of the present invention include various imaging apparatus such as digital still cameras (camera 1) mentioned above, as well as other electronic apparatus including a display unit capable of moving to stored, drawing, and rotated positions. The display unit also includes electronic viewfinders other than the electronic viewfinder described above. Moreover, embodiments of the present invention include electronic apparatus having a movable unit other than the display unit, which is connected to the main body of the electronic apparatus via a flexible substrate. Examples of such movable units include operation units for performing user operations on the electronic apparatus and expandable units that move to stretch the electronic apparatus.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

According to the present disclosure, by restricting the movement and deformation of the flexible substrate in response to the movement and rotation of the movable unit, it is possible to avoid excessive load and pinching of the flexible substrate.

This application claims priority to Japanese Patent Application No. 2022-091080, which was filed on Jun. 3, 2022, and which is hereby incorporated by reference herein in its entirety.

What is claimed is:

1. An electronic apparatus comprising:

a movable unit configured to move between a stored position and a drawing position, and to rotate between the drawing position and a rotated position relative to a main body of the electronic apparatus; and a flexible substrate configured to electrically connect the movable unit and the main body, wherein the flexible substrate includes a flexible portion between a first fixed portion fixed to the movable unit and a second fixed portion fixed on a main body side relative to the first fixed portion, wherein the flexible portion has a first shape, a second shape, and a third shape, each being different from one another when the movable unit is in the stored position, the drawing position, and the rotated position, respectively, wherein the movable unit has a first substrate restriction portion, which is positioned in a storage direction relative to the first and second fixed portions when in the stored position, and is positioned in a drawing direction relative to the second fixed portion when in the drawing position, as a portion capable of contacting the flexible portion, and wherein the first substrate restriction portion restricts deformation of the flexible portion from the second shape to any shape other than the first shape when the movable unit moves from the drawing position to the stored position, and restricts deformation of the flexible portion from the third shape to any shape other than the second shape when the movable unit rotates from the rotated position to the drawing position.

2. The electronic apparatus according to claim 1, wherein when the movable unit moves from the drawing position to the stored position, the first substrate restriction portion contacts the flexible portion and moves so that the flexible portion deforms from the second shape to the first shape.

3. The electronic apparatus according to claim 1, wherein the first substrate restriction portion approaches the flexible portion while rotating during rotation of the movable unit from the rotated position to the drawing position to restrict deformation of the flexible portion into shapes other than the second shape.

4. The electronic apparatus according to claim 1, wherein when the movable unit is in the stored position, the flexible portion has a part that is positioned in the storage direction relative to the second fixed portion and a part that is positioned in the drawing direction relative to the second fixed portion, and wherein when the movable unit is in the drawing position and the rotated position, the entire flexible portion is positioned in the drawing direction relative to the second fixed portion.

5. The electronic apparatus according to claim 1, wherein when the movable unit, which is in the stored position or the drawing position, is viewed from a first direction extending along a rotation axis serving as a rotation center of the movable unit, ends on a first fixed portion side and on a second fixed portion side of the flexible portion are positioned on opposite sides relative to the first fixed portion in a second direction orthogonal to the first direction, the storage direction, and drawing direction.

6. The electronic apparatus according to claim 5, wherein when the movable unit, which is in the stored position or the drawing position, is viewed from the first direction, the rotation axis is positioned on the same side as the end on the first fixed portion side of the flexible portion relative to the first fixed portion in the second direction.

7. The electronic apparatus according to claim 6, wherein when the movable unit, which is in the stored position or the drawing position, is viewed from the first direction, the end on the first fixed portion side is positioned closer to the rotation axis than the end on the second fixed portion side in the second direction.

8. The electronic apparatus according to claim 1, wherein when the movable unit, which is in the stored position or the drawing position, is viewed from a first direction extending along a rotation axis serving as a rotation center of the movable unit, the entire flexible portion and the first substrate restriction portion are positioned within outer dimensions of the movable unit in the second direction, which is orthogonal to the first direction, the storage direction, and drawing direction.

9. The electronic apparatus according to claim 1, wherein when the movable unit is in the stored position or the drawing position, a distance between the end on the first fixed portion side of the flexible portion and the first substrate restriction portion in the storage and drawing directions is smaller than a drawable amount of the movable unit from the stored position to the drawing position.

10. The electronic apparatus according to claim 1, wherein the movable unit has an appearance-forming portion that is not exposed to an outside from the main body at the stored position and the drawing position and is exposed to the outside at the rotated position, and wherein the first substrate restriction portion is provided integrally with the appearance-forming portion.

11. The electronic apparatus according to claim 1, wherein the movable unit has a second substrate restriction portion that contacts the flexible portion to reduce force applied to the end on the first fixed portion side of the flexible portion during at least one of the movement and rotation of the movable unit.

12. The electronic apparatus according to claim 1, further comprising:

an imaging element configured to image an optical image formed by an optical system; and a display element configured to display an image formed using an output signal from the imaging element, wherein the movable unit includes the display element.

* * * * *